(12) United States Patent
Geng et al.

(10) Patent No.: US 12,164,050 B2
(45) Date of Patent: Dec. 10, 2024

(54) METHOD AND APPARATUS FOR POSITIONING

(71) Applicant: Telefonaktiebolaget LM Ericsson (publ), Stockholm (SE)

(72) Inventors: Yi Geng, Nanjing (CN); Cuichun Xia, Nanjing (CN); Jianxiang Zhao, Nanjing (CN); Hao Chen, Nanjing (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 201 days.

(21) Appl. No.: 17/438,212

(22) PCT Filed: Mar. 10, 2020

(86) PCT No.: PCT/CN2020/078578
§ 371 (c)(1),
(2) Date: Sep. 10, 2021

(87) PCT Pub. No.: WO2020/182120
PCT Pub. Date: Sep. 17, 2020

(65) Prior Publication Data
US 2022/0179036 A1    Jun. 9, 2022

(30) Foreign Application Priority Data

Mar. 12, 2019  (WO) ................ PCT/CN2019/077851

(51) Int. Cl.
*G01S 5/06* (2006.01)
*G01S 5/02* (2010.01)
(Continued)

(52) U.S. Cl.
CPC .............. *G01S 5/06* (2013.01); *G01S 5/0273* (2013.01); *H01Q 3/20* (2013.01); *H01Q 19/185* (2013.01)

(58) Field of Classification Search
CPC ....... G01S 5/0273; H01Q 3/20; H01Q 19/185
(Continued)

(56) References Cited

U.S. PATENT DOCUMENTS 3,742,513 A  *  6/1973  Ehrenspeck ......... H01Q 19/185
                                                    343/915
8,155,668 B2 *  4/2012  Kobayakawa ............ G01S 5/14
                                                    455/454
(Continued)

FOREIGN PATENT DOCUMENTS

CN       109085564 A     12/2018
GB        2565106 A  *   2/2019 ............. G01S 13/46
(Continued)

OTHER PUBLICATIONS

Soltanaghaei et al. "Multipath Triangulation: Decimeter-level WiFi Localization and Orientation with a Single Unaided Receiver." Proc of the 16th Annual International Conf on Mobile Systems, Applications, and Services. Association for Computing Machinery, New York, NY, pp. 376-388. Jun. 2018. (Year: 2018).*
(Continued)

*Primary Examiner* — Bo Fan
(74) *Attorney, Agent, or Firm* — Weisberg I.P. Law, P.A.

(57) ABSTRACT

Embodiments of the present disclosure provide method and apparatus for positioning. The method may comprise receiving a first radio signal of a terminal device located in the area from a line of sight (LOS) path between the antenna array and the terminal device; receiving a second radio signal of the terminal device located in the area from at least one path reflected by the reflector; determining respective angles of arrival of the LOS path and the at least one path reflected by the reflector; and determining a location of the terminal device by using triangulation based on the respective angles of arrival.

14 Claims, 23 Drawing Sheets

(51) Int. Cl.
*H01Q 3/20* (2006.01)
*H01Q 19/185* (2006.01)

(58) Field of Classification Search
USPC .......................................... 342/453, 146, 59
See application file for complete search history.

(56) References Cited

U.S. PATENT DOCUMENTS

| | | | |
|---|---|---|---|
| 10,079,435 B1* | 9/2018 | Minko | G01S 3/14 |
| 2006/0082502 A1* | 4/2006 | Dooley | G01S 5/0218 |
| | | | 342/453 |
| 2006/0192719 A1* | 8/2006 | Kong | H01Q 19/106 |
| | | | 343/789 |
| 2015/0244070 A1* | 8/2015 | Cheng | H01Q 21/20 |
| | | | 343/836 |
| 2016/0366554 A1 | 12/2016 | Markhovsky et al. | |
| 2017/0026798 A1 | 1/2017 | Prevatt | |
| 2018/0031671 A1* | 2/2018 | Alexander | G01S 5/0072 |
| 2019/0146052 A1* | 5/2019 | Chiu | H04B 7/024 |
| | | | 342/146 |
| 2020/0244327 A1* | 7/2020 | Bøjer | H01Q 9/30 |

FOREIGN PATENT DOCUMENTS

| | | |
|---|---|---|
| WO | WO 2016/011433 A2 | 1/2016 |
| WO | WO 2017/164925 A1 | 9/2017 |

OTHER PUBLICATIONS

International Search Report and Written Opinion for International Application No. PCT/CN2020/078578 dated Jun. 2, 2020, 10 pages.

\* cited by examiner

900

902
Receiving a first radio signal of a terminal device located in the area from a line of sight (LOS) path between the antenna array and the terminal device 904
Receiving a second radio signal of the terminal device located in the area from at least one path reflected by the reflector 906
Determining respective angles of arrival of the LOS path and the at least one path reflected by the reflector 907
Refining the respective angles of arrival of the LOS path and the at least one path reflected by the reflector based on two or more received radio signals 908
Determining a location of the terminal device by using triangulation based on the respective angles of arrival 910
Transforming the location of the terminal device to coordinate information of World Geodetic System(WGS)

FIG. 9

METHOD AND APPARATUS FOR POSITIONING

TECHNICAL FIELD

The non-limiting and exemplary embodiments of the present disclosure generally relate to the technical field of communications, and specifically to method and apparatus for positioning.

BACKGROUND

This section introduces aspects that may facilitate a better understanding of the disclosure. Accordingly, the statements of this section are to be read in this light and are not to be understood as admissions about what is in the prior art or what is not in the prior art.

Positioning techniques such as TOA (time of arrival), TDOA (time difference of arrival), AOA (angle of arrival), FDOA (frequency difference of arrival) and PSS (received signal strength) are known in a wide variety of radio access technologies. For example, the AOA technique, sometimes referred to as direction of arrival (DOA), locates a user equipment (UE) by determining angle of incidence at which signals arrive at a receiving antenna. Geometric relationships can then be used to estimate the location of the UE from an intersection of two lines formed by radial lines to two receiving antennas. In generally, at least two receiving antennas are required for location estimation with improved accuracy coming from at least three or more receiving antennas.

AOA techniques have been applied in a cellular network to provide location tracking services for mobile phone users. Multiple base stations calculate the AOA of the signal of the UE, and use this information to perform triangulation. That information may be relayed to a location management node that may calculate the UE's location by using triangulation and convert the UE's location to latitude and longitude coordinates.

In generally, TOA and TDOA techniques request at least three base stations to locate UE, and they need very tight relative time synchronization. AOA technique requests at least two base stations to locate UE. FDOA technique can be used for UE that moves only. PSS technique is affected by noise and interference and it has a low accuracy.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a method for positioning which can be performed by a single base station comprising an antenna array with a radiation pattern including a main lobe, a back lobe and one or more side lobes and a reflector configured to reflect a part of energy of the back lobe to an area of at least one of the one or more side lobes.

In a first aspect of the disclosure, there is provided a method at a network device. The network device comprises an antenna device including an antenna array with a radiation pattern including a main lobe, a back lobe and one or more side lobes and a reflector configured to reflect a part of energy of the back lobe to an area of at least one of the one or more side lobes. The method comprises receiving a first radio signal of a terminal device located in the area from a line of sight (LOS) path between the antenna array and the terminal device; receiving a second radio signal of the terminal device located in the area from at least one path reflected by the reflector; determining respective angles of arrival of the LOS path and the at least one path reflected by the reflector; and determining a location of the terminal device by using triangulation based on the respective angles of arrival.

In an embodiment, when there are two or more paths reflected by the reflector, determining the location of the terminal device may comprise determining one LOS path of the second radio signal between the reflector and the terminal device; and determining the location of the terminal device by using triangulation based on the respective angles of arrival of the LOS path and the determined one LOS path.

In an embodiment, determining one LOS path between the reflector and the terminal device may be based on at least one of a power of the second radio signal on each of the two or more paths; whether a straight line path of the second radio signal incident upon the reflector and the LOS path are intersected in the area; the angle of arrival of the LOS path and the angle of arrival of the second radio signal incident upon the reflector; and whether the nearest points of a straight line path of the second radio signal incident upon the reflector and the LOS path are located in the area.

In an embodiment, when the determined one LOS path on the reflector and the LOS path are two skew lines, determining the location of the terminal device may comprise determining the location of the terminal device as a center of a line segment formed by the nearest points of the determined one LOS path and the LOS path.

In an embodiment, the method may further comprise transforming the location of the terminal device to coordinate information of World Geodetic System(WGS).

In an embodiment, the first and second radio signal comprise a random access radio signal and/or a radio resource control connection request radio signal.

In an embodiment, the method may further comprise refining the respective angles of arrival of the LOS path and the at least one path reflected by the reflector based on two or more received radio signals.

In an embodiment, the method may further comprise performing beamforming based on the location of the terminal device; and transmitting one or more beams to the terminal device based on the beamforming.

In an embodiment, a first beam of the one or more beams may be transmitted to the terminal device through the reflection of the reflector.

In an embodiment, a second beam of the one or more beams may be transmitted to the terminal device along the LOS path.

In an embodiment, the terminal device may comprise a drone or a user equipment.

In a second aspect of the disclosure, there is provided an apparatus at a network device. The network device comprises antenna device including an antenna array with a radiation pattern including a main lobe, a back lobe and one or more side lobes and a reflector configured to reflect a part of energy of the back lobe to an area of at least one of the one or more side lobes. The apparatus comprises a processor; a memory coupled to the processor, said memory containing instructions executable by said processor, whereby said apparatus is operative to receive a first radio signal of a terminal device located in the area from a line of sight (LOS) path between the antenna array and the terminal device; receive a second radio signal of the terminal device located in the area from at least one path reflected by the reflector; determine respective angles of arrival of the LOS path and the at least one path reflected by the reflector; and determine a location of the terminal device by using triangulation based on the respective angles of arrival.

In a third aspect of the disclosure, there is provided a computer program product, comprising instructions which, when executed on at least one processor, cause the at least one processor to carry out the method according to the first aspect of the disclosure.

In a fourth aspect of the disclosure, there is provided a computer-readable storage medium storing instructions which when executed by at least one processor, cause the at least one processor to carry out the method according to the first aspect of the disclosure.

In a fifth aspect of the disclosure, there is provided a network device. The network device comprises an antenna device including an antenna array with a radiation pattern including a main lobe, a back lobe and one or more side lobes and a reflector configured to reflect a part of energy of the back lobe to an area of at least one of the one or more side lobes. The network device further comprises a first receiving unit configured to receive a first radio signal of a terminal device located in the area from a line of sight (LOS) path between the antenna array and the terminal device; a second receiving unit configured to receive a second radio signal of the terminal device located in the area from at least one path reflected by the reflector; a first determining unit configured to determine respective angles of arrival of the LOS path and the at least one path reflected by the reflector; and a second determining unit configured to determine a location of the terminal device by using triangulation based on the respective angles of arrival.

The proposed solution may have some advantages as following. The proposed solution can perform positioning of a UE within one network device such as base station, for example each base station can perform the positioning of the UE independently. The proposed solution does not require UE feedback. The proposed solution can provide a high accuracy. The proposed solution can get a tighter accuracy with the antenna array including more antenna elements. The proposed solution is synchronization free. The proposed solution can get better performance for high frequency than traditional methods.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 9 shows a flowchart of a method according to an embodiment of the present disclosure;

DETAILED DESCRIPTION

Figure 1:
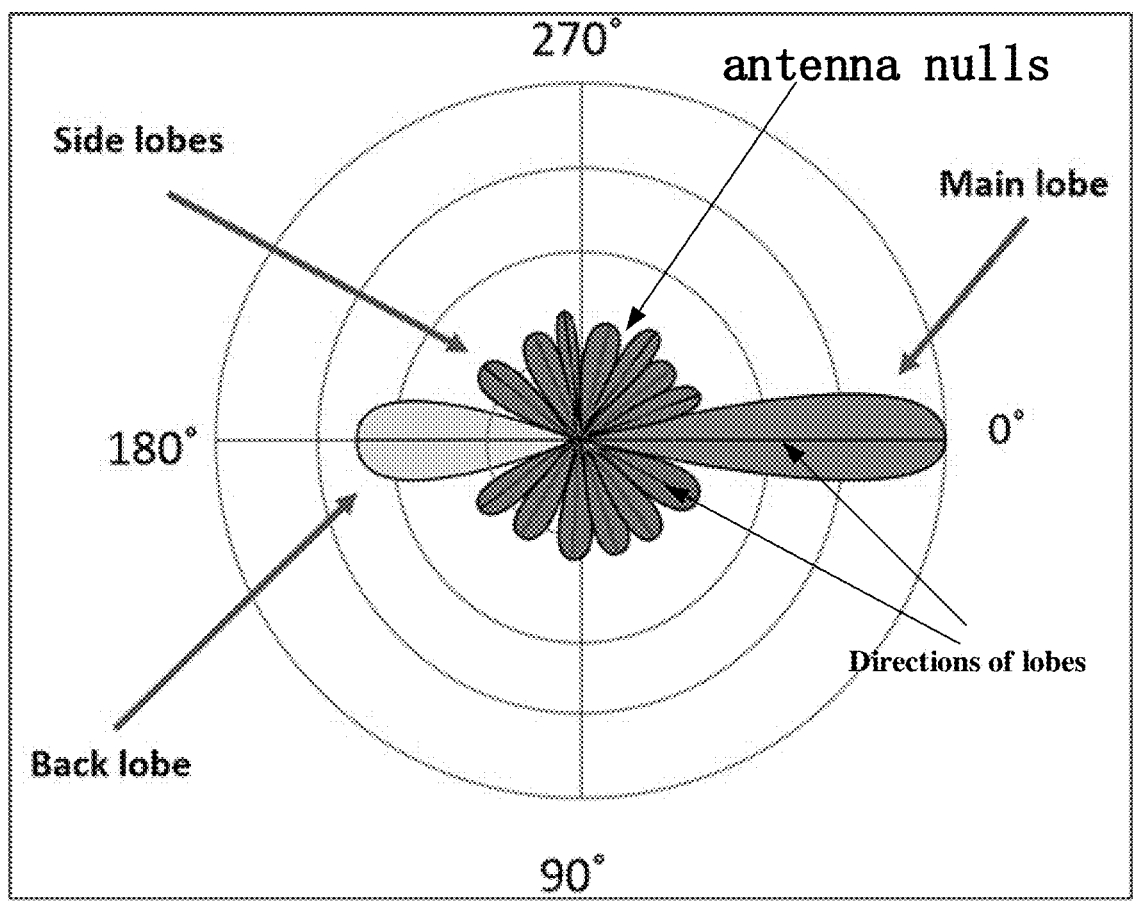
FIG. 1 schematically shows a radiation pattern of an antenna device.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as defined by 3GPP may comprise the second generation (2G), the third generation(3G), the fourth generation (4G), 4.5G, the fourth generation (5G) communication protocols, and/or any other protocols either currently known or to be developed in the future.

The term "network device" refers to a network device in a communication network via which a terminal device accesses to the network and receives services therefrom. For example, in a wireless communication network such as a 3GPP-type cellular network, the network device may refer to access network device. The access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. Each access network device is connectable to the core network device over a wired or wireless connection.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE), a drone and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

For illustrative purposes, several embodiments of the present disclosure will be described in the context of cellular network. Those skilled in the art will appreciate, however, that the concept and principle of the several embodiments of the present disclosure may be more generally applicable to any other suitable communication networks.

FIG. 1 schematically shows a radiation pattern of an antenna device. The radiation pattern of the antenna device shows a pattern of "lobes" at various angles and directions where the radiated signal strength reaches a maximum. The lobes are separated by "nulls" at angles and directions where the radiated signal strength falls to zero. In a directional antenna in which the objective is to emit the radio waves in one direction, the lobe in that direction may be designed to have a larger field strength than the others. This lobe may be referred to as "main lobe". The other lobes may be referred to as "side lobes", and usually represent unwanted radiation in undesired directions. A side lobe in the opposite direction (180°) from the main lobe is called the back lobe. Different antenna configuration may have different number of side lobes and different angular coverage area (steering range). Traditional directional antenna has a reflector to remove the back lobe and concentrate energy in the direction of main lobe for antenna gain.

Figure 2:
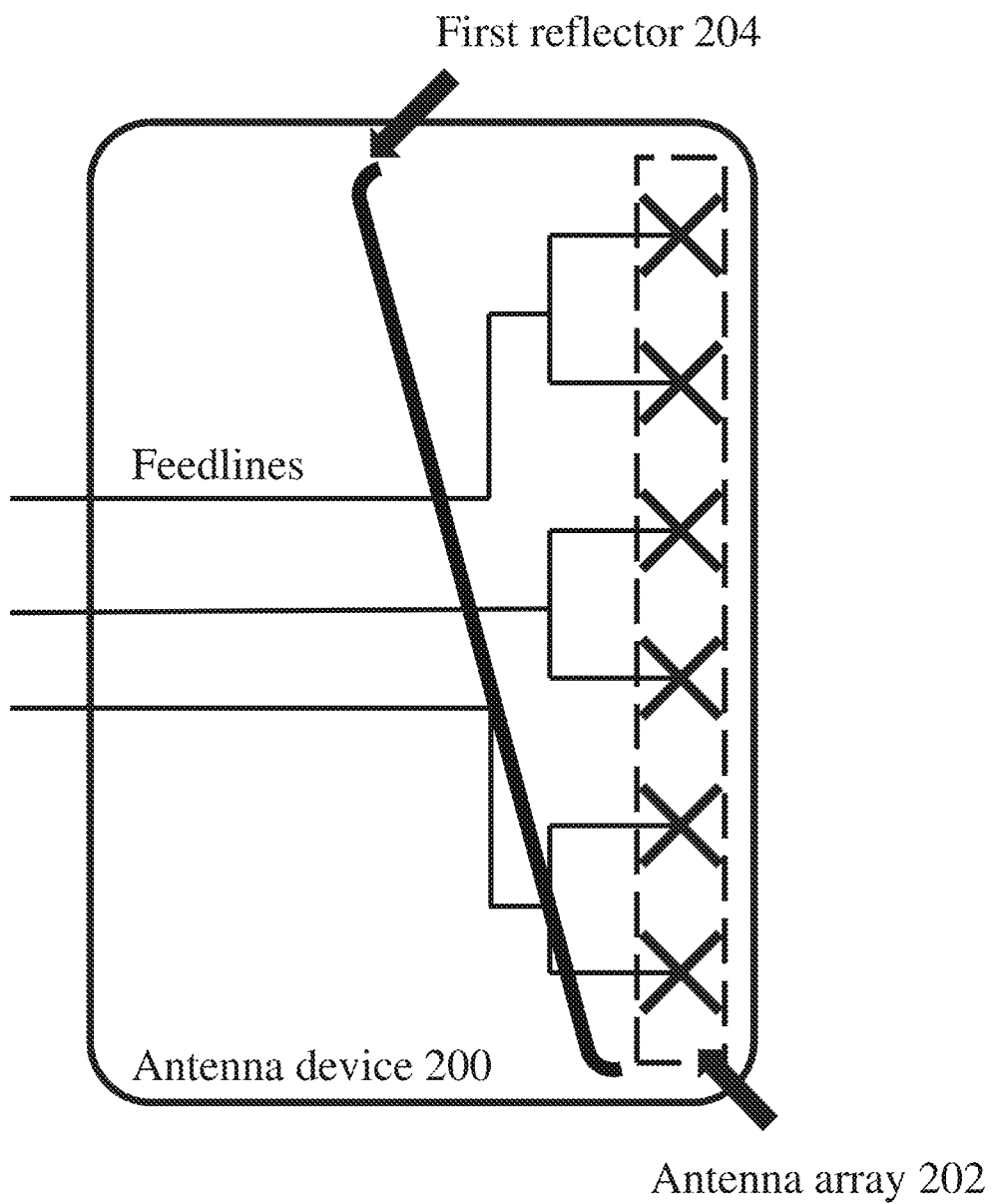
FIG. 2 is a schematic diagram showing an antenna device according to an embodiment of the disclosure.

FIG. 2 is a schematic diagram showing an antenna device, in which some embodiments of the present disclosure can be implemented. The antenna device 200 comprises an antenna array 202 with a radiation pattern including a main lobe and a back lobe. The radiation pattern may further include one or more side lobes in addition to the main lobe and the back lobe. The antenna array 202 may be a set of multiple connected antennas which work together as a single antenna, to transmit or receive radio waves. The individual antennas in the antenna array 202 may be usually connected to a single receiver and/or transmitter by feedlines that feed the power to the individual antennas in a specific phase relationship. The radio waves radiated by each individual antenna combine and superpose, adding together (interfering constructively) to enhance the power radiated in desired directions, and cancelling (interfering destructively) to reduce the power radiated in other directions. Similarly, when used for receiving, the separate radio frequency signals from the individual antennas combine in the receiver with the correct phase relationship to enhance signals received from the desired directions and cancel signals from undesired directions. In addition, the antenna array 202 may be connected to multiple transmitter or receiver modules, each connected to a separate antenna element or a group of antenna elements. The antenna array can achieve higher gain (directivity), that is a narrower beam of radio waves, than could be achieved by a single antenna element. In general, the larger the number of individual antenna elements used, the higher the gain and the narrower the beam.

The antenna device 200 further comprises a first reflector 204 able to be configured to reflect a first part of energy of the back lobe to at least one direction different from a direction of the main lobe. The at least one direction different from the direction of the main lobe may be any suitable direction for example depending on the specific application scenario. As a first example, when the antenna device is used to serve wireless devices such as drones and user equipments in planes in the sky, the at least one direction different from the direction of the main lobe may comprise a direction toward sky. As a second example, when the antenna device is used to serve wireless devices in an indoor area, the at least one direction different from the direction of the main lobe comprises a direction toward the indoor area. As a third example, when the antenna device is used to serve wireless devices on at least one ground area, the at least one direction different from the direction of the main lobe comprises the directions toward the at least one ground area.

In this embodiment, the main lobe and the reflected back lobe may be used to cover two different areas respectively. As a first example, the main lobe may be used to cover an area on the ground and the reflected back lobe may be used to cover an area in the sky, or vice versa. As a second example, the main lobe may be used to cover an area on the ground and the reflected back lobe may be used to cover another area on the ground. As a third example, the main lobe may be used to cover an area in the sky and the reflected back lobe may be used to cover another area in the sky.

In an embodiment, the first part of energy of the back lobe is from 0% to 100% of the energy of the back lobe. 100% means that there is not any other reflector configured to reflect the energy of the back lobe to the direction of the main lobe (or front direction). The back lobe may share 50% of total radiation energy of the antenna device. 0% means that back lobe is removed and all radiation energy may be concentrated in the front direction (i.e., the direction of the main lobe).

In an embodiment, at least one of an orientation, a shape and a dimension of the first reflector are able to be adjusted manually or automatically. The first reflector may include any suitable mechanical and/or electronic device (not shown in FIG. 2) to enable the at least one of an orientation, a shape and a dimension of the first reflector can be adjusted manually or automatically.

Figure 3:
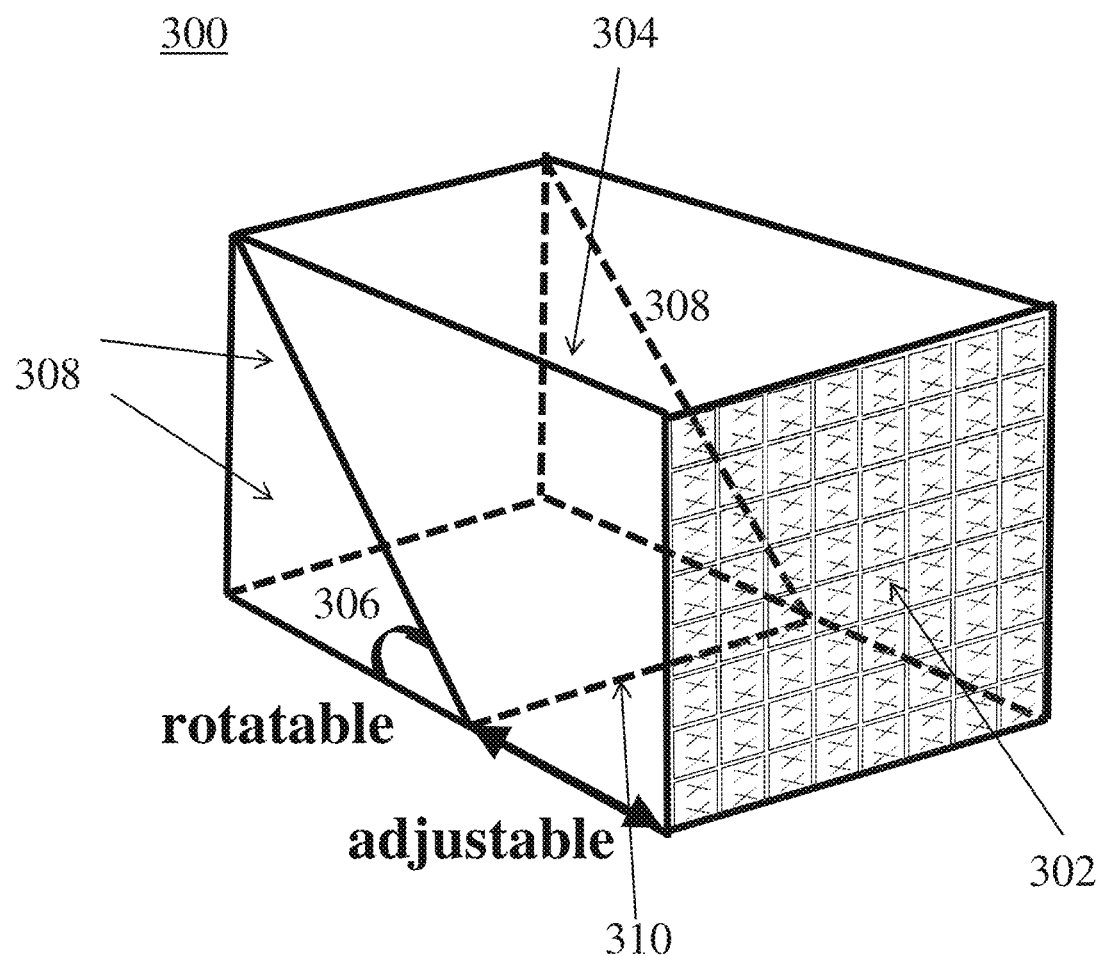
FIG. 3 is a schematic diagram showing an antenna device according to another embodiment of the disclosure.

FIG. 3 is a schematic diagram showing an antenna device 300, in which some embodiments of the present disclosure can be implemented. In this embodiment, the first reflector 304 may include a reflecting plate having a bottom wall 306 and side walls 308 being inclinedly mounted facing upward to reflect and guide the back lobe wave to a wanted direction. The angle of the first reflector 304 can be adjusted manually or remotely for network tuning by rotating round a rotatable and slideable element 310. The location of the first reflector 304 can be adjusted manually or remotely for network tuning by sliding the rotatable and slideable element 310 on the bottom wall 306.

In an embodiment, the first reflector may include one of a metal plate, a wire mesh, parallel wires or metal bars. Generally, any conductor in a flat sheet will act in a mirror-like fashion for radio signals, but this also holds true for non-continuous surfaces as long as the gaps between the conductors are less than about 1/10 of the target wavelength. This means that wire mesh or even parallel wires or metal bars can be used, which is especially useful both for reducing the total amount of material and/or reducing wind loads.

In an embodiment, the first reflector may include a plurality of reflector elements each of which comprises one of a metal plate, a wire mesh, parallel wires or metal bars. Generally the plurality of reflector elements may locate in a same plane. In an embodiment, the plurality of reflector elements may have the same shape and dimension. In another embodiment, the plurality of reflector elements may have different shape and dimension. In addition, the location and/or the orientation of each reflector element are able to be adjusted manually or automatically. For example, a first part of the plurality of reflector elements may be located at a first location and face a first direction, a second part of the plurality of reflector elements may be located at a second location and face a second direction, and so on.

Figure 4:
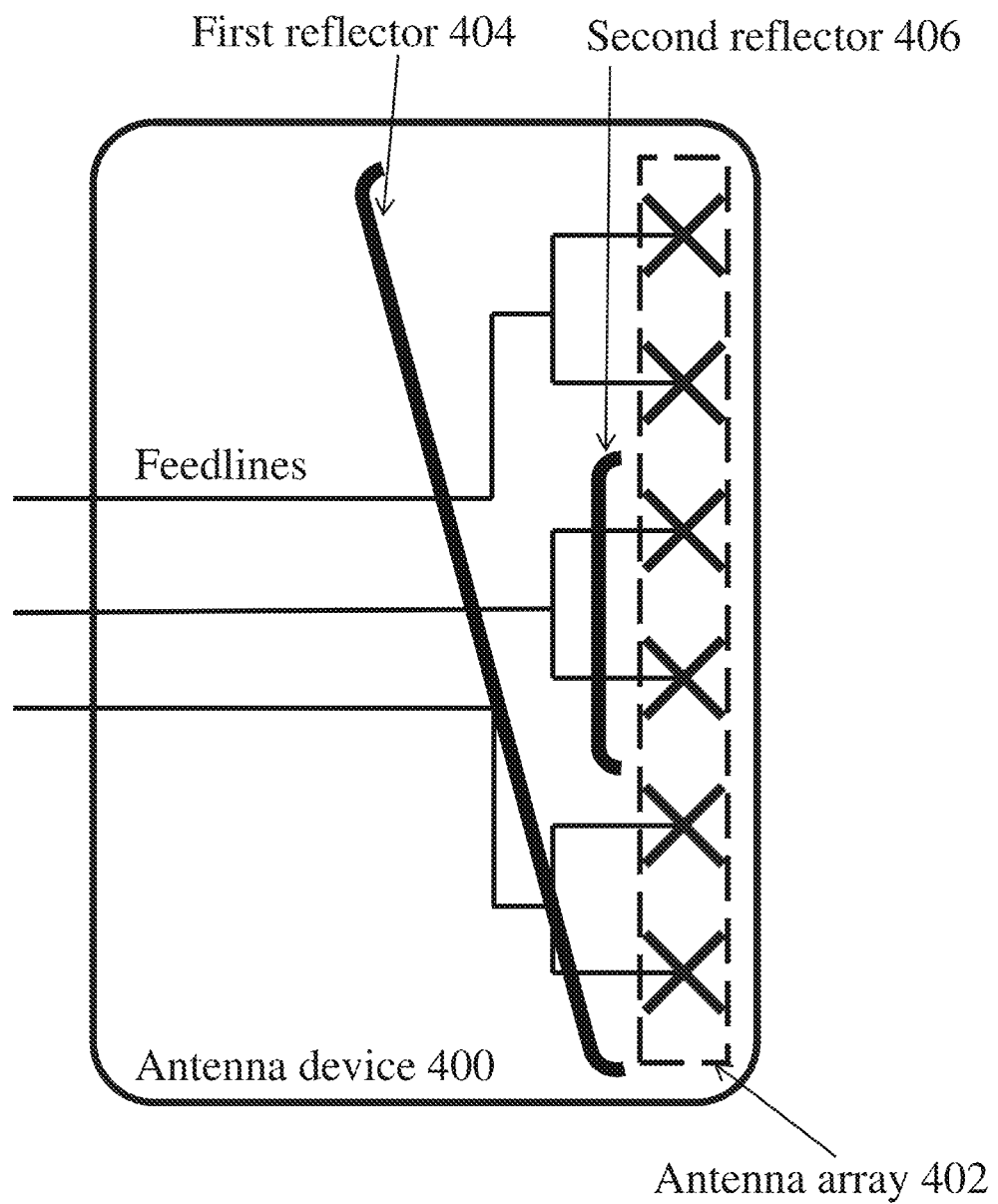
FIG. 4 is a schematic diagram showing an antenna device according to another embodiment of the disclosure.

FIG. 4 is a schematic diagram showing an antenna device, in which some embodiments of the present disclosure can be implemented. The antenna device 400 comprises an antenna array 402 with a radiation pattern including a main lobe and a back lobe and a first reflector 404 able to be configured to reflect a first part of energy of the back lobe to a direction different from a direction of the main lobe. The antenna array 402 and first reflector 404 may be similar to the antenna array 202 and first reflector 204 of FIG. 2. In addition, the antenna device further comprises a second reflector 406 able to be configured to reflect a second part of energy of the back lobe to a direction of the main lobe. In generally, in order for the signal reflected by the second reflector 406 to add to the output signal of main lobe to achieve gain, this may require the second reflector 406 to be placed at ½ of a wavelength behind the antenna array 402. However, there are a number of factors that can change this distance, and the location of the second reflector 406 may vary.

In an embodiment, the energy of the back lobe consists of the first part of energy of the back lobe and the second part of energy of the back lobe. For example, if a part of energy of the back lobe is reflected by the first reflector, then the other part of energy of the back lobe is reflected by the second reflector. How much energy of the back lobe is to be reflected by the first reflector can be controlled by adjusting the shape and a dimension of the second reflector.

In an embodiment, at least one of an orientation, a shape and a dimension of the second reflector is able to be adjusted manually or automatically. The second reflector may include any suitable mechanical and/or electronic device (not shown in FIG. 4) to enable at least one of an orientation, a shape and a dimension of the second reflector can be adjusted manually or automatically.

In an embodiment, the second reflector includes one of a metal plate, a wire mesh, parallel wires or metal bars.

In an embodiment, the second reflector includes a plurality of reflector elements each of which comprises one of a metal plate, a wire mesh, parallel wires or metal bars.

In an embodiment, at least a part of the first reflector is configured to reflect a part of energy of the back lobe to the direction of the main lobe and the at least a part of the first reflector is set in a same plane as the second reflector. The location and orientation of the at least a part of the first reflector can be adjusted such that the at least a part of the first reflector and the second reflector are located in a same plane. For example, when the first reflector includes a plurality of reflector elements each of which may comprise one of a metal plate, a wire mesh, parallel wires or metal bars, the location and orientation of at least a part of the plurality of reflector elements can be adjusted such that the at least a part of the plurality of reflector elements and the second reflector are located in a same plane. In this embodiment, the at least a part of the first reflector can take the role of the second reflector.

Figure 5:
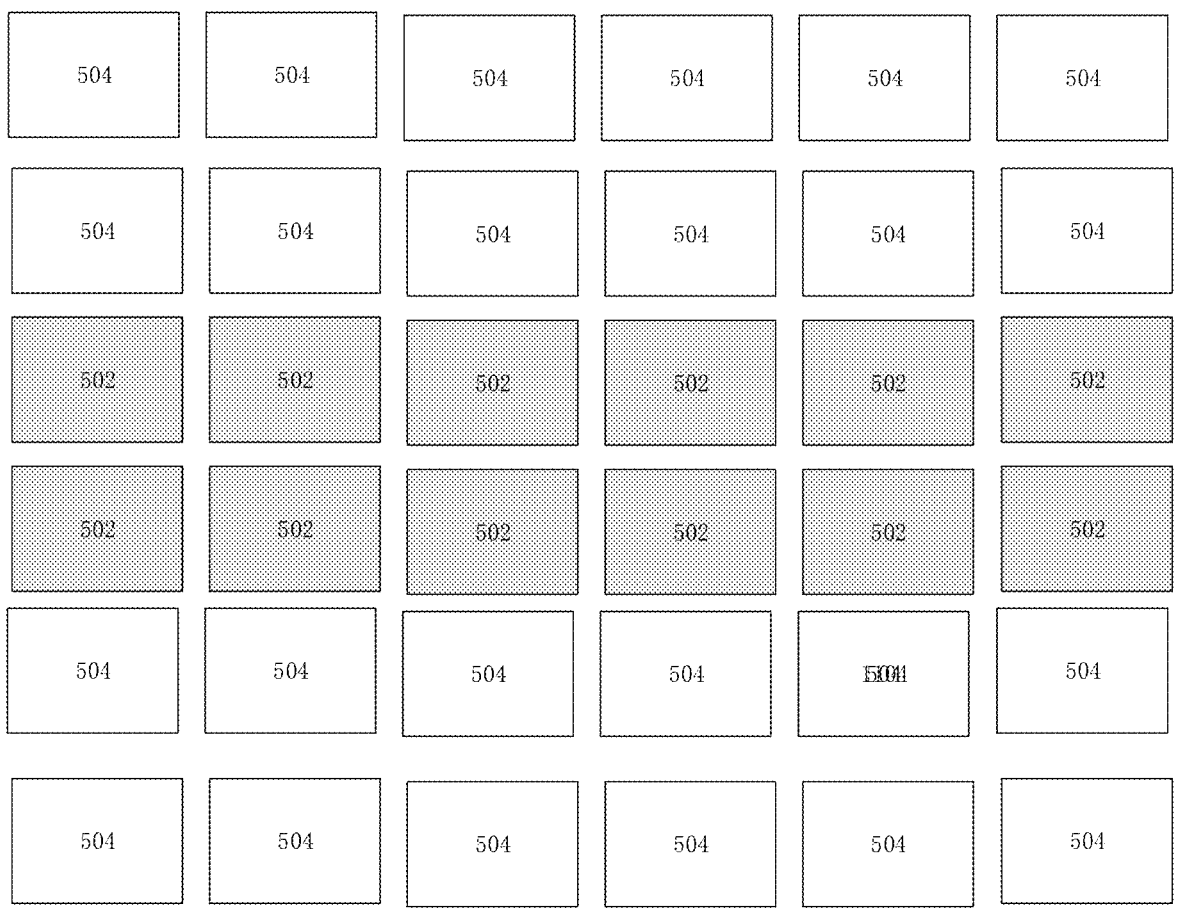
FIG. 5 is a schematic diagram showing the first reflector and the second reflector according to an embodiment of the disclosure.
Figure 6:
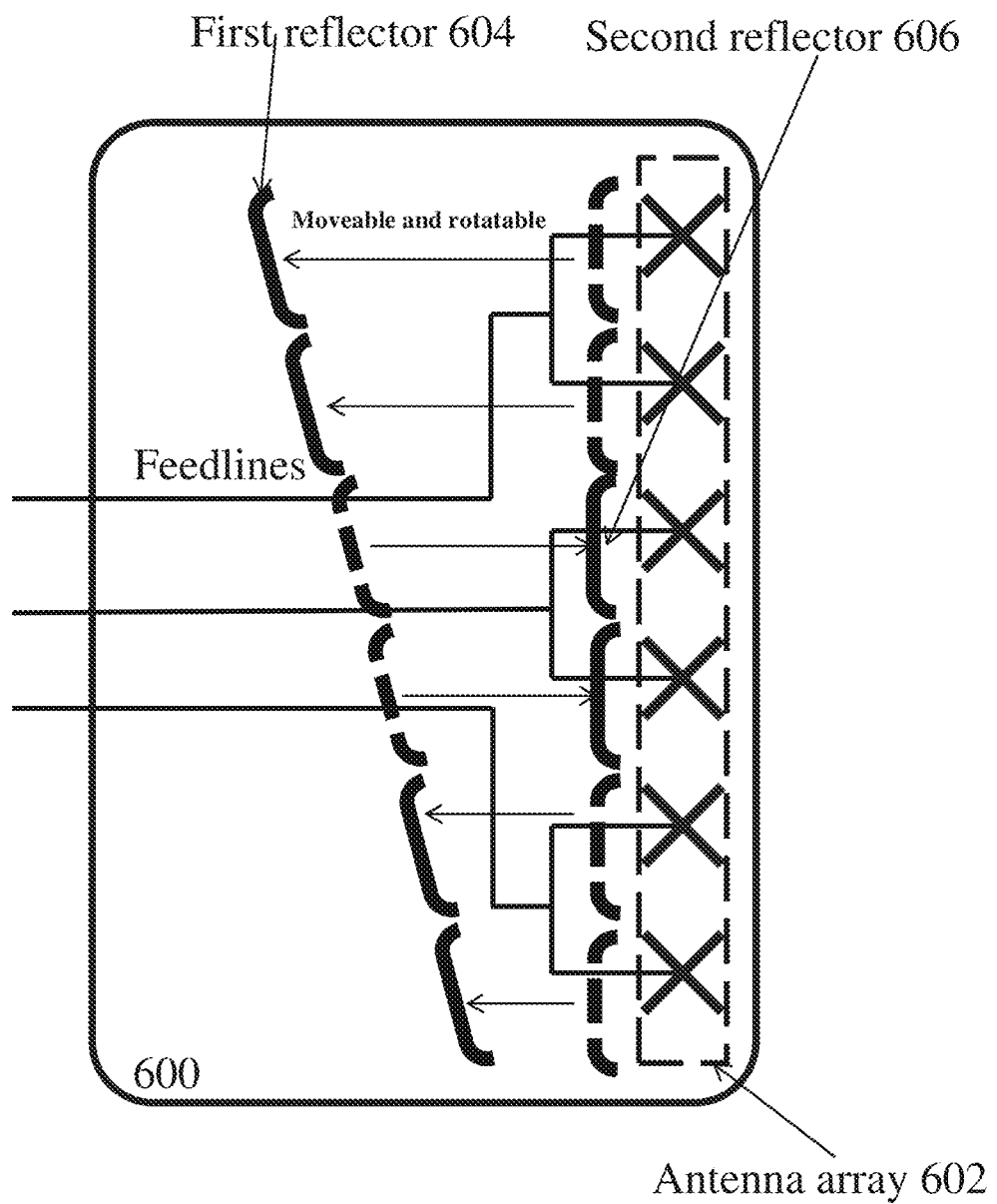
FIG. 6 is a schematic diagram showing an antenna device according to another embodiment of the disclosure.
Figure 7:
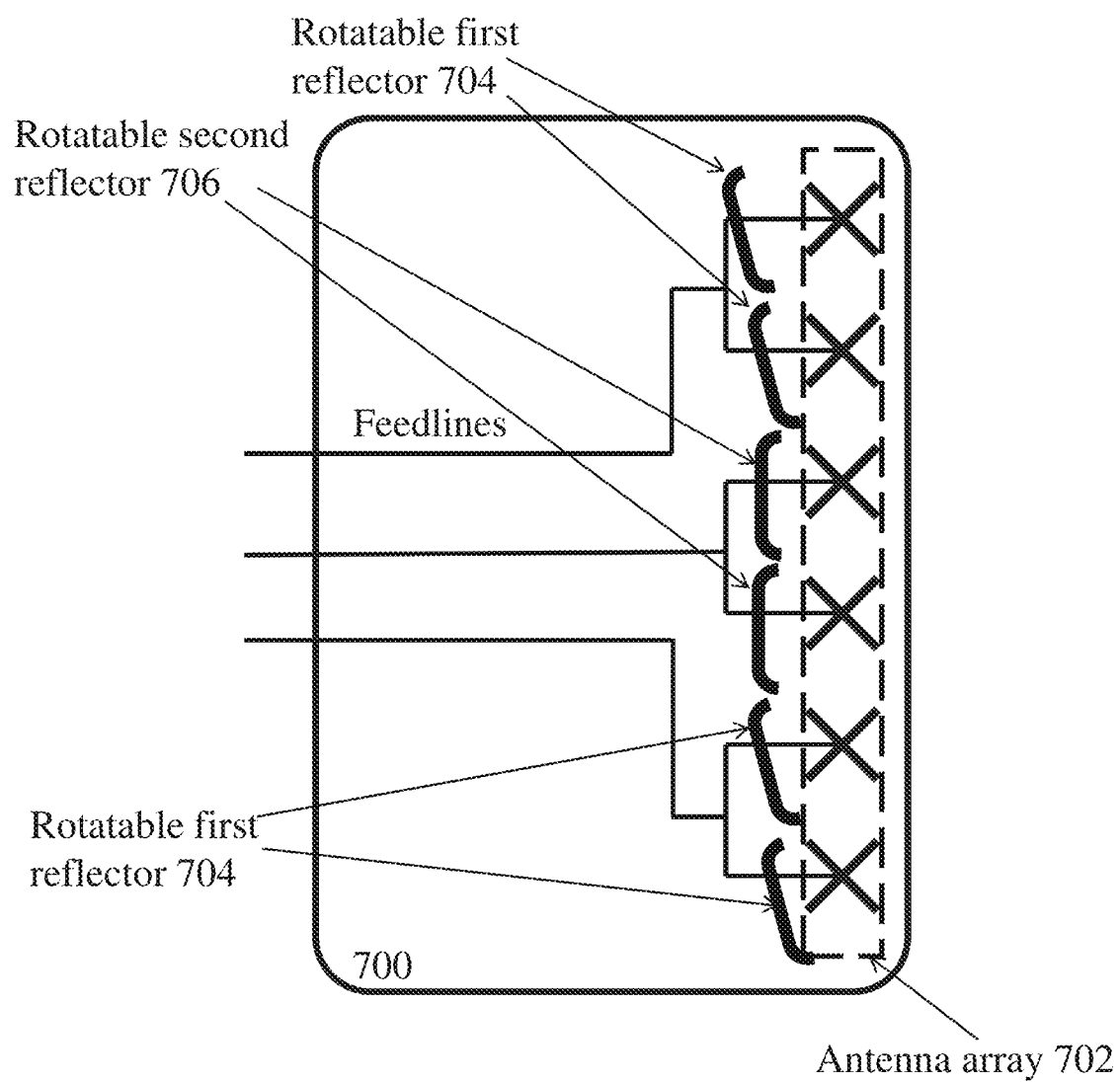
FIG. 7 is a schematic diagram showing an antenna device according to another embodiment of the disclosure.

FIG. 5 is a schematic diagram showing the first reflector and the second reflector according to an embodiment of the disclosure. As shown in FIG. 5, there are 24 first reflectors 504 and 12 second reflectors 502, each of which is a metal plate. It is noted that the numbers, shape and dimension of the first reflectors and the second reflectors shown in FIG. 5 are only for the purpose of illustration and may be different in other embodiments. The location and/or orientation of each reflector can be adjusted as shown in FIGS. 6-7.

In an embodiment, the antenna device is used for a base station such as NodeB, eNodeB, gNB, and so forth. In addition, the antenna device may be used for any other suitable radio frequency devices in other embodiments.

Figure 8:
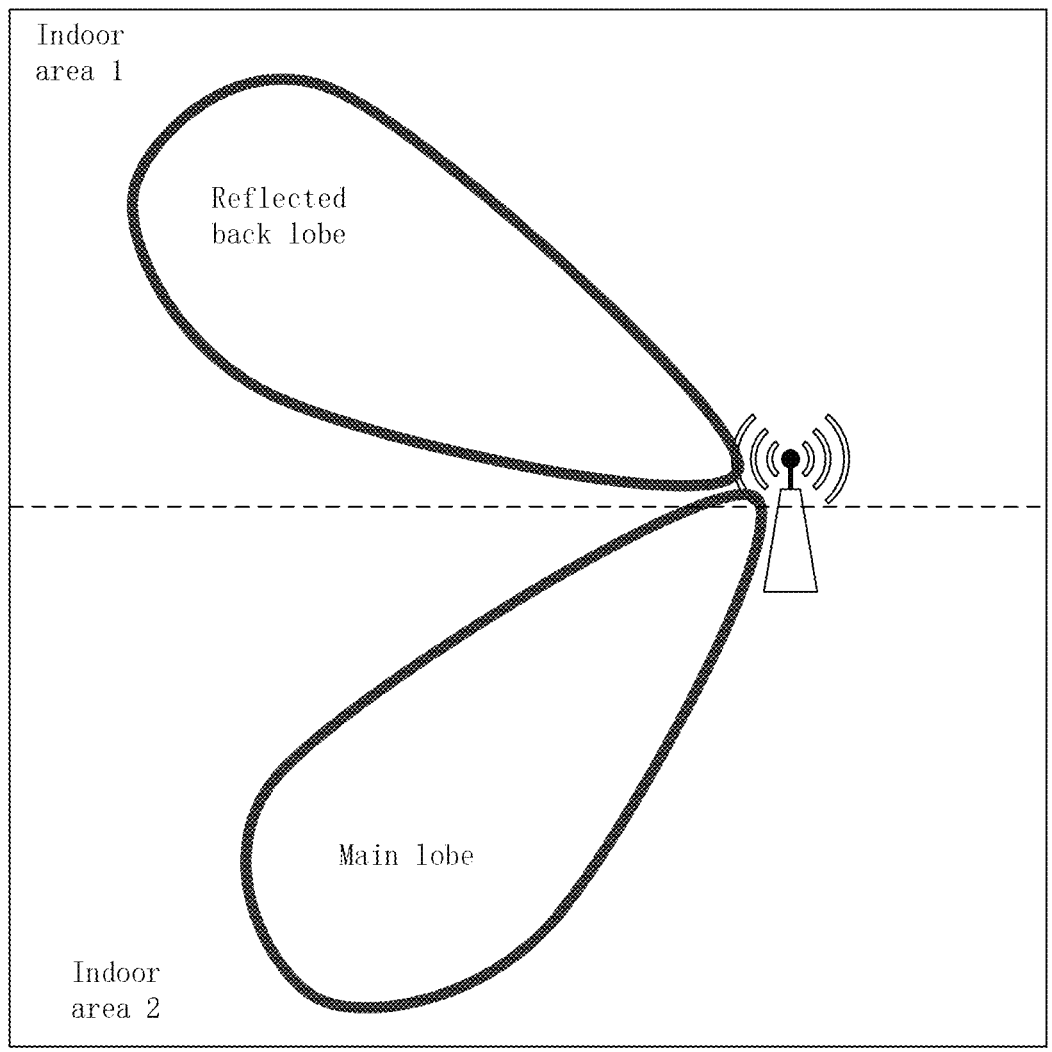
FIG. 8 schematically shows an indoor scenario where the antenna device can be used.

In an embodiment, the antenna device is used in indoor scenario as shown in FIG. 8. As shown in the FIG. 8, in the indoor scenario, the main lobe of the antenna device may be used to serve an indoor area 2 and the reflected back lobe may be used to serve another indoor area 1. It is noted that FIG. 8 only shows an example indoor scenario, and there may be any other suitable indoor scenarios which can use the antenna device according to embodiments of the disclosure.

FIG. 9 shows a flowchart of a method according to an embodiment of the present disclosure, which may be performed by an apparatus implemented in/as a network device or communicatively coupled to a network device. As such, the apparatus may provide means for accomplishing various parts of the method 900 as well as means for accomplishing other processes in conjunction with other components. The network device comprises an antenna device including an antenna array with a radiation pattern including a main lobe, a back lobe and one or more side lobes and a reflector configured to reflect a part of energy of the back lobe to an area of at least one of the one or more side lobes. The antenna device may be similar to those as described with reference to FIGS. 2-8.

At block 902, the network device receives a first radio signal of a terminal device located in the area from a line of sight (LOS) path between the antenna array and the terminal device.

At block 904, the network device receives a second radio signal of the terminal device located in the area from at least one path reflected by the reflector.

The first radio signal and the second radio signal may be any suitable radio signal for example depending on a specific wireless communication system. In general, the first radio signal and the second radio signal may be the same one radio signal sent by the terminal device. As a first example, the terminal device may be configured with an omnidirectional antenna which can send the radio signal to any direction, and the network device such as base station may receive the first radio signal and the second radio signal of the terminal device from the LOS path and at least one path reflected by the reflector. As a second example, the terminal device may be configured with an antenna array and can perform beam forming, and the terminal device may send the radio signal in two beams along the LOS path and at least one path reflected by the reflector. In other embodiments, the first radio signal and the second radio signal may be two different radio signals. In generally, the first radio signal and the second radio signal may be received by the network device substantially simultaneously.

Figure 10:
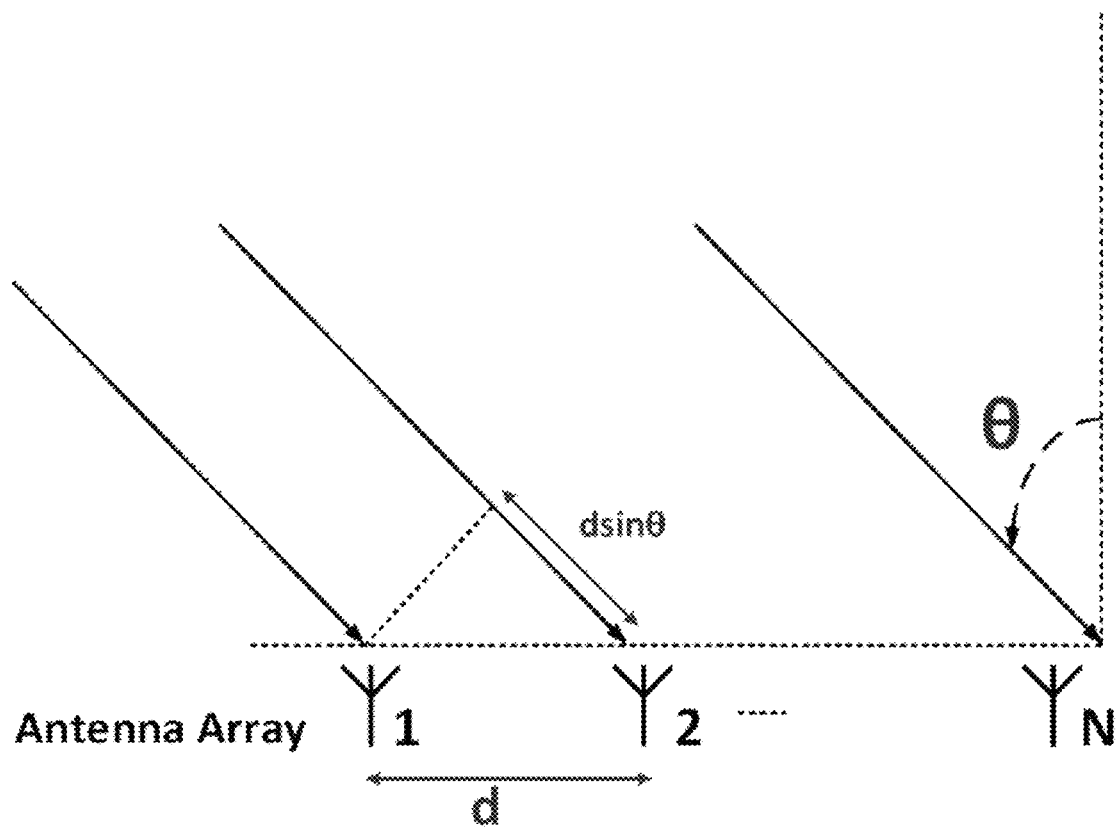
FIG. 10 schematically shows a principle of how to estimate AOA.

At block 906, the network device determines respective angles of arrival (AOA) of the LOS path and the at least one path reflected by the reflector. FIG. 10 schematically shows a principle of how to estimate AOA. As shown in FIG. 10, an antenna array at a receiver side may be used to estimate the angle at which a transmitted signal impinges on the receiver by exploiting and calculating a time difference of arrival at individual elements of the antenna array.

Figure 11:
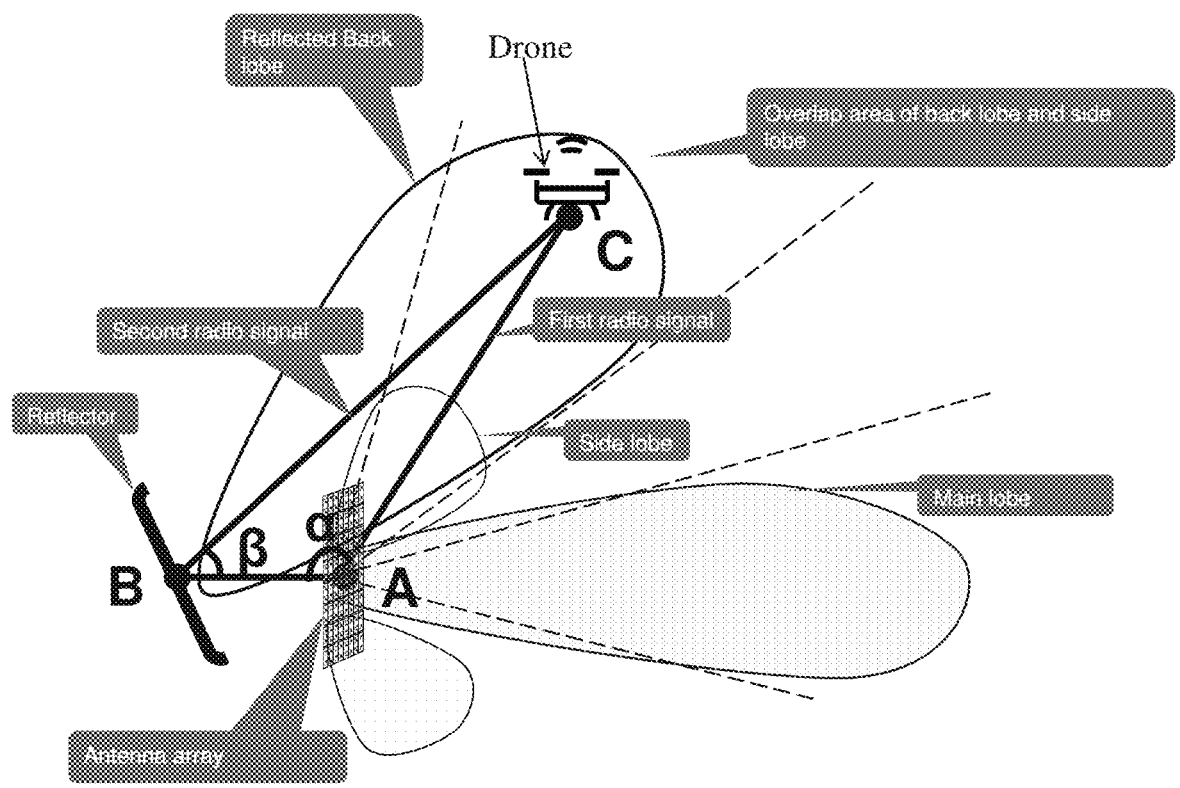
FIGS. 11-12 schematically show an example of how to determine the location of the terminal device by using triangulation based on the respective angles of arrival according to embodiments of the disclosure.
Figure 12:
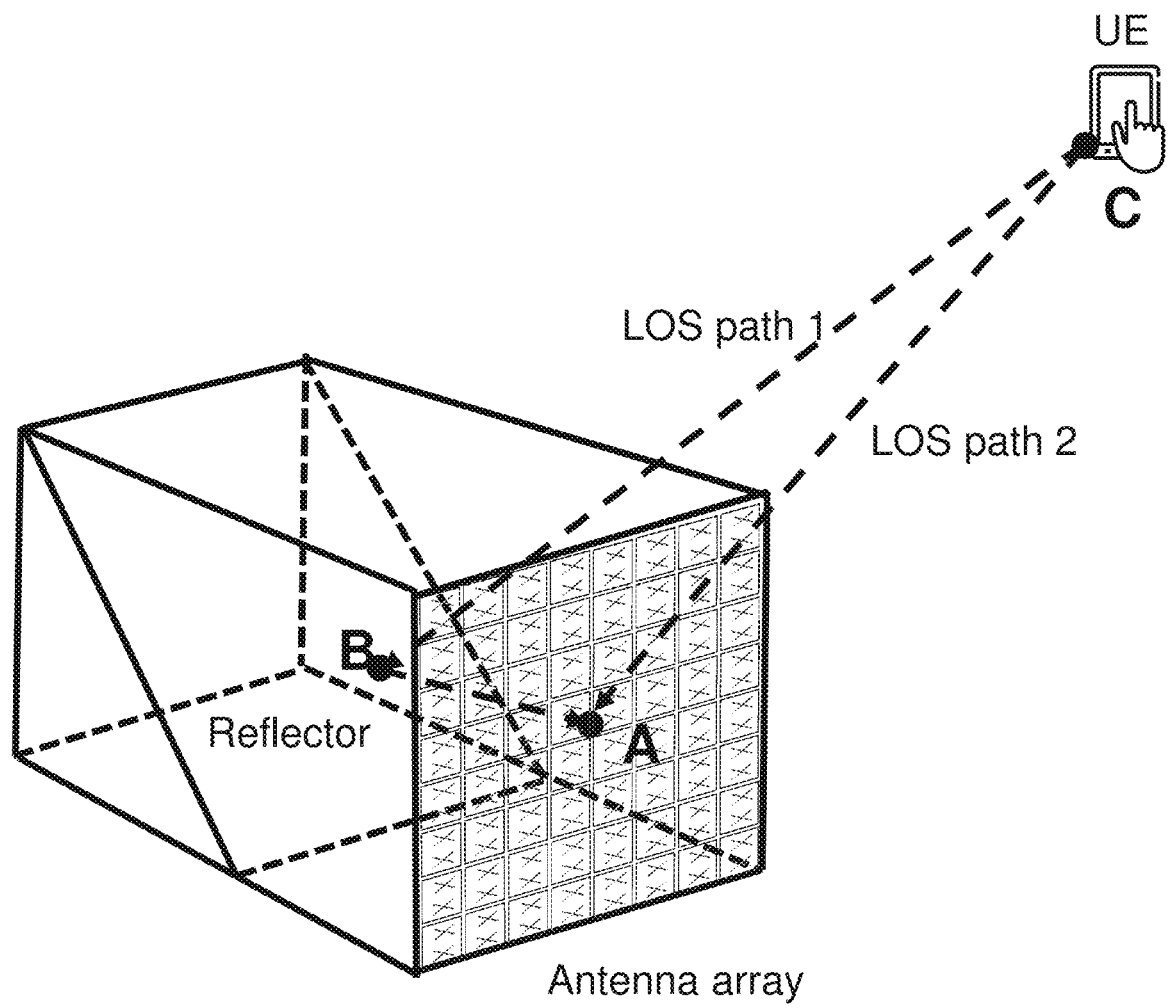

At block 908, the network device determines a location of the terminal device by using triangulation based on the respective angles of arrival. FIGS. 11-12 schematically show an example of how to determine the location of the terminal device by using triangulation based on the respective angles of arrival according to embodiments of the disclosure. As shown in FIGS. 11-12, by adjusting inclined angle of the reflector, there is a spatial area which is overlapped by at least one side lobe and the reflected back lobe. A terminal device such as a drone is located at a coordinate of point $C(x_3,y_3,z_3)$ of the overlap area. One antenna element of the antenna array at a coordinate of point A $(x_1,y_1,z_1)$ receives the first radio signal of the terminal device from the LOS path (i.e., line CA) between the antenna array and the terminal device and receives the second radio signal of the terminal device from a path (i.e., line CB) reflected by the reflector. Point B $(x_2,y_2,z_2)$ is a reflected point of the path (i.e., line CB) reflected by the reflector. In this embodiment, point A $(x_1,y_1,z_1)$ is located at a center of the antenna array. In other embodiments, point A $(x_1,y_1,z_1)$ may be located at any other suitable location of the antenna array. When the network device has received the first radio signal and the second radio signal from the LOS path and the path reflected by the reflector, the network device may determine respective angles of arrival of the LOS path and the path reflected by the reflector. For example, the network device may determine respective angles of arrival by using the principle as shown in FIG. 10 or using any other suitable AOA determination method. In an embodiment, AOA of the LOS path (i.e., line CA) may be defined as the angle α formed by lines AB and AC as shown in FIGS. 11-12, and the AOA of the path (i.e., line CB) reflected by the reflector may be defined as the angle β formed by lines BC and AB as shown in FIGS. 11-12. In other embodiment, when the AOA of the LOS path (i.e., line CA) and the AOA of the path (i.e., line CB) reflected by the reflector are defined as other angles, and the angles α and β can be determined accordingly.

The network device such as base station knows an inclined angle of the reflector and coordinates of points A and B. The equations for lines AB, AC and BC are given in form separately:

$$\frac{x-x_1}{x_2-x_1} = \frac{y-y_1}{y_2-y_1} = \frac{z-z_1}{z_2-z_1}$$

$$\frac{x-x_1}{x_3-x_1} = \frac{y-y_1}{y_3-y_1} = \frac{z-z_1}{z_3-z_1}$$

$$\frac{x-x_2}{x_3-x_2} = \frac{y-y_2}{y_3-y_2} = \frac{z-z_2}{z_3-z_2}$$

And the explicit expression for cos α and cos β are given:

$$\cos\alpha = \frac{|(x_2-x_1)(x_{AC}-x_1)+(y_2-y_1)(y_{AC}-y_1)+(z_2-z_1)(z_{AC}-z_1)|}{\sqrt{(x_2-x_1)^2+(y_2-y_1)^2+(z_2-z_1)^2}\sqrt{(x_{AC}-x_1)^2+(y_{AC}-y_1)^2+(z_{AC}-z_1)^2}}$$

-continued $$\cos\beta = \frac{|(x_2-x_1)(x_{BC}-x_2)+(y_2-y_1)(y_{BC}-y_2)+(z_2-z_1)(z_{BC}-z_2)|}{\sqrt{(x_2-x_1)^2+(y_2-y_1)^2+(z_2-z_1)^2}\sqrt{(x_{BC}-x_2)^2+(y_{BC}-y_2)^2+(z_{BC}-z_2)^2}}$$

where $(x_{AC},y_{AC},z_{AC})$ is any point on line AC, and $(x_{BC},y_{BC},z_{BC})$ is any point on line BC.

According to triangulation, from known points A, B and known angles α, β, coordinate of point $C(x_3,y_3,z_3)$ can be determined.

Figure 13:
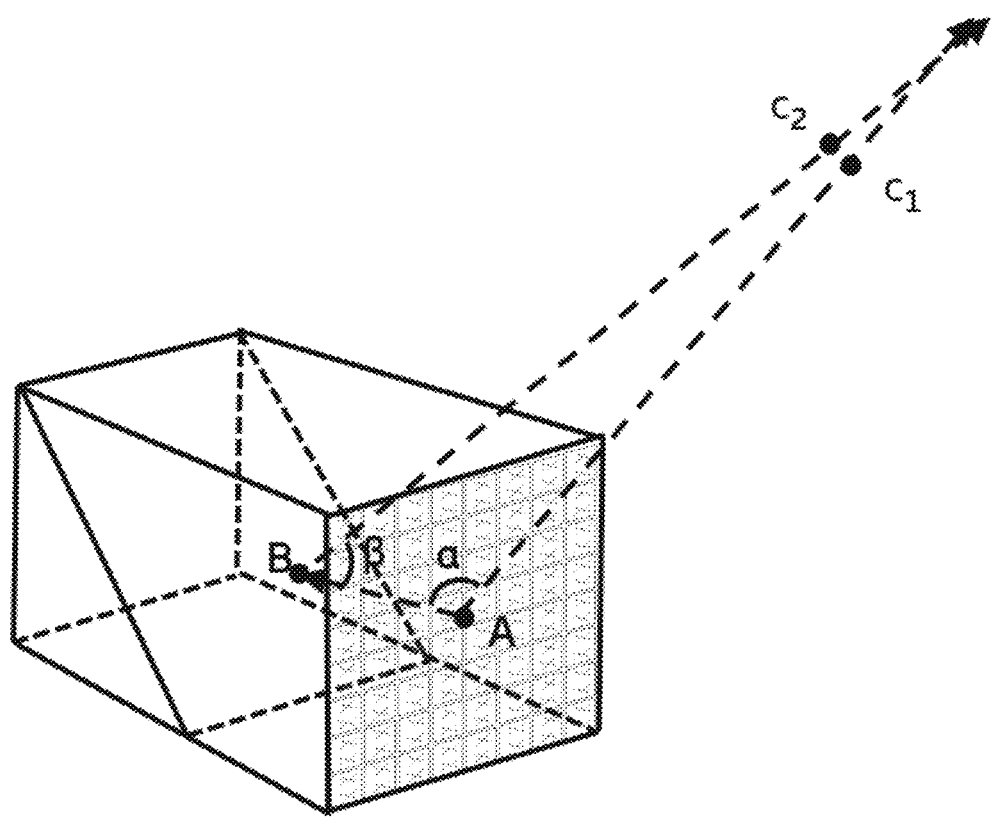
FIG. 13 schematically shows an example of how to determine the location of the terminal device by using triangulation based on the respective angles of arrival according to another embodiment of the disclosure.

FIG. 13 schematically shows an example of how to determine the location of the terminal device by using triangulation based on the respective angles of arrival according to another embodiment of the disclosure. Above calculation with reference to FIGS. 11-12 is based on an ideal scenario that the LOS path (i.e., line CA) and the path (i.e., line CB) reflected by the reflector intersect at point C. But usually these paths may be affected by many factors such as antenna configuration, interference, etc. In this embodiment, the LOS path (i.e., line $AC_1$) and the path (i.e., line $BC_2$) reflected by the reflector do not intersect.

As shown in FIG. 13, lines formed by two paths ($AC_1$ and $BC_2$) to the same terminal device such as UE or drone are skew lines. Skew lines are two lines that do not intersect and are not parallel. Points $C_1$ and $C_2$ are the nearest points between lines $AC_1$ and $BC_2$. The UE is located on or near the line segment $C_1C_2$.

The network device may calculate coordinates of the nearest points $C_1$ and $C_2$. When points $C_1$ and $C_2$ are located in the overlap area of the side lobe and the reflected back lobe, the network device may determine that lines $AC_1$ and $BC_2$ are pointing to the same terminal device such as UE or drone. In an embodiment, the network device may determine the location of the terminal device at a center of the line segment formed by points $C_1$ and $C_2$.

Figure 14:
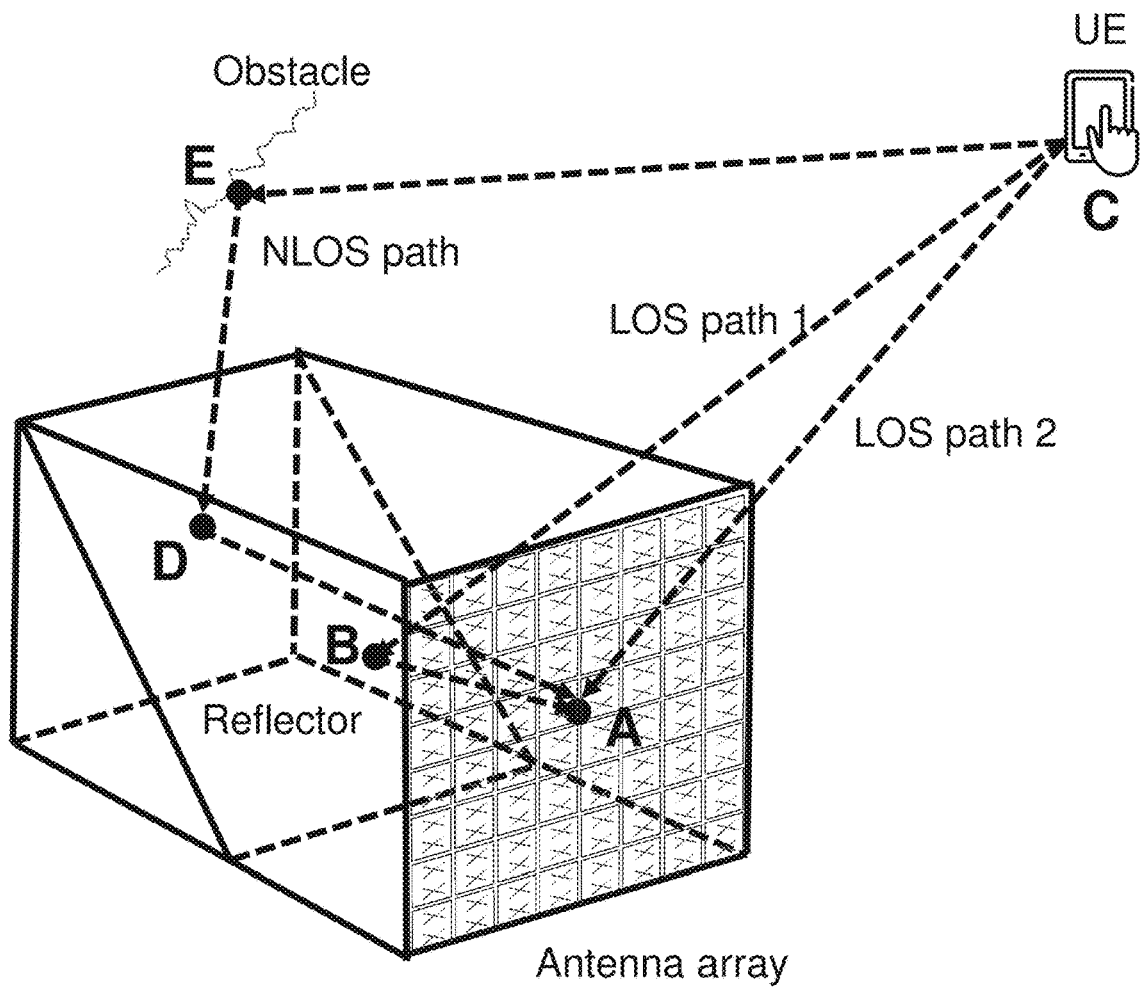
FIG. 14 schematically shows an example of how to determine the location of the terminal device by using triangulation based on the respective angles of arrival according to another embodiment of the disclosure.

FIG. 14 schematically shows an example of how to determine the location of the terminal device by using triangulation based on the respective angles of arrival according to another embodiment of the disclosure. In this embodiment, there are two or more paths reflected by the reflector, the network device may determine one LOS path of the second radio signal between the reflector and the terminal device; and determine the location of the terminal device by using triangulation based on the respective angles of arrival of the LOS path and the determined one LOS path.

As shown in FIG. 14, there are a LOS path and a non line of sight (NLOS) path between the terminal device and the reflector. It is noted that there may be two or more NLOS paths between the terminal device and the reflector though only one NLOS path is shown in FIG. 14. The network device can get the terminal device's position with two LOS paths by using triangulation, so the NLOS path should be excluded. The network device such as base station can divide three paths (i.e., AC, ABC, ADEC) into two aggregates (AC) and (ABC, ADEC), which are side lobe beam aggregate and back lobe beam aggregate respectively. The network device may determine the location of the terminal device one by one from the two aggregates and the LOS path between the reflector and the terminal device can be found. For example, the network device such as base station gets equation of lines AB, AC and AD, and calculates equation of lines BC and DE according to the reflector's information (such as position, angle). Put lines BC, DE into the back lobe beam aggregate and put line AC into the side lobe beam aggregate. The network device may execute LOS path judgment to find out LOS path between the reflector and the terminal device in back lobe beam aggregate. It is line BC in this example. According to triangulation, from known points A, B and known angles ABC, BAC, coordinate of point $C(x_3,y_3,z_3)$ can be determined.

There are several ways to determine if a path between the reflector and the terminal device is reflected or not. In an embodiment, the network device may determine one LOS path between the reflector and the terminal device based on at least one of a power of the second radio signal on each of the two or more paths; whether a straight line path of the second radio signal incident upon the reflector and the LOS path are intersected in the area; the angle of arrival of the LOS path and the angle of arrival of the second radio signal incident upon the reflector; and whether nearest points of a straight line path of the second radio signal incident upon the reflector and the LOS path are located in the area. As a first example, the power of the second radio signal on the LOS path may be larger than the second radio signal on the NLOS path and the network device may determine a path having the largest power of the second radio signal as the LOS path between the reflector and the terminal device. As a second example, when the straight line path of the second radio signal incident upon the reflector and the LOS path between the terminal device and the antenna array are intersected in the area of at least one of the one or more side lobes, and the network device may determine a path of the second radio signal as the LOS path between the reflector and the terminal device. As a third example, as show in FIGS. 11-12, when a sum of angles $\alpha$ and $\beta$ is smaller than a threshold for example 180 degree, and the network device may determine the path of BC as the LOS path between the reflector and the terminal device. As a fourth example, when the nearest points of a straight line path of the second radio signal incident upon the reflector and the LOS path between the terminal device and the antenna array are located in the overlap area, and the network device may determine the straight line path as the LOS path between the reflector and the terminal device. The range of the overlap area can be calculated for example with antenna configuration (such as the location and angle the reflector and the distance between the reflector and the antenna array, etc.) and the coordinate of network device such as base station. If the two paths are intersected at an unreasonable place, or the nearest points of the two paths are outside of the overlap area, the network device may determine that the radio signal on the path between the reflector and the terminal device propagates under NLOS condition.

At block 908 (optional), the network device may transform the location of the terminal device to coordinate information of World Geodetic System(WGS). For example, after get the location of the terminal device, coordinate transformation between WGS(B,L,H) and three dimensional Cartesian coordinate system (X,Y,Z) can be executed to get longitude(L), latitude(B) and height(H) of the terminal device. World Geodetic System(WGS) is the reference coordinate system used by the Global Positioning System(GPS). The coordinate transformation between WGS(B,L,H) and three dimensional Cartesian coordinate system(X,Y,Z) are known, therefore the detail description thereof is omitted here for brevity.

In an embodiment, the method 900 can be applied in relativistic coordinate systems like local Cartesian coordinate system to get a high accuracy than WGS.

In addition, high frequency wave such as millimeter wave in 5G and in-door scenario can achieve very good performance with this solution. High frequency bands i.e. SHF, EHF, the dimension of antenna decreases with wavelength, so in-door base station is easy to provide longer distance between the antenna array and the reflector than outdoor macro station, and upgrade accuracy. And with higher frequencies attenuation and path loss increase especially after reflection, small coverage and LOS with micro station scenario are more helpful to apply this solution. The proposed method can support many in-door applications such as Virtual reality (VR) Augmented Reality (AR) use cases.

In an embodiment, the first and second radio signal may comprise a random access radio signal and/or a radio resource control connection request radio signal. In other embodiments, the first and second radio signal may comprise any other suitable radio signal.

At block 907 (optional), the network device may refine the respective angles of arrival of the LOS path and the at least one path reflected by the reflector based on two or more received radio signals. For example, the network device such as base station may use information from a specific message such as Physical Random Access Channel (PRACH) received from the terminal device to improve the reception and to refine the AOA estimate.

Figure 15:
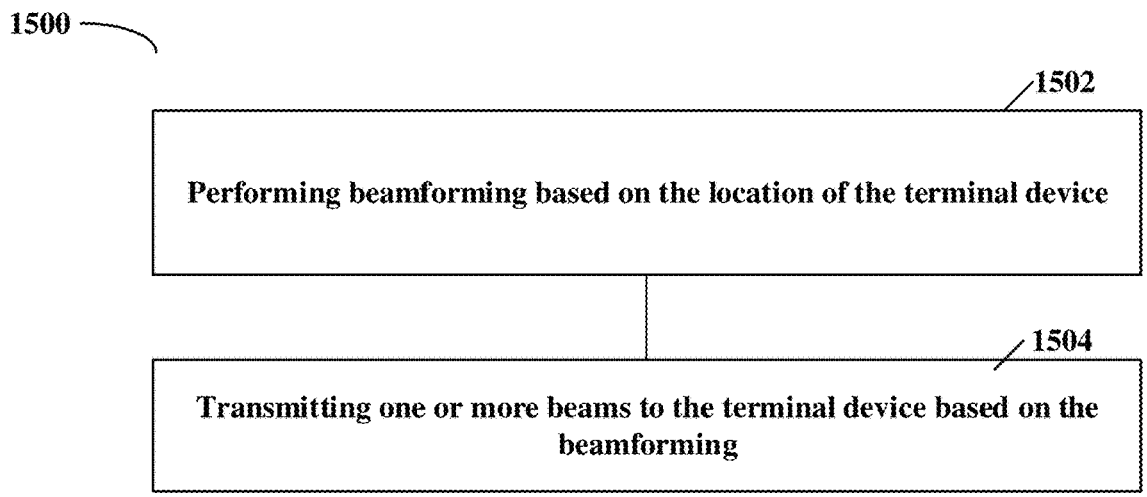
FIG. 15 shows a flowchart of a method according to an embodiment of the present disclosure.

FIG. 15 shows a flowchart of a method according to an embodiment of the present disclosure, which may be performed by an apparatus implemented in/as a network device or communicatively coupled to a network device. As such, the apparatus may provide means for accomplishing various parts of the method 1500 as well as means for accomplishing other processes in conjunction with other components. The network device comprises an antenna array with a radiation pattern including a main lobe, a back lobe and one or more side lobes and a reflector configured to reflect a part of energy of the back lobe to an area of at least one of the one or more side lobes. The antenna array and the reflector may be similar to those as described with reference to FIGS. 2-8.

At block 1502, the network device may perform beamforming based on the location of the terminal device. For example, the network device may use any suitable beamforming techniques to perform beamforming to form one or more beams pointing to the terminal device, for example one beam along the LOS path between the antenna array and the terminal device and another beam along the path reflected by the reflector. The width of the one or more beams may be determined by the number of antenna elements in antenna array and the quality of the AOA estimation. The width of the one or more beams can be controlled if necessary in the analog domain.

At block 1504, the network device may transmit the one or more beams to the terminal device based on the beamforming. Any suitable message can be transmitted on the beam.

In an embodiment, a first beam of the one or more beams may be transmitted to the terminal device through the reflection of the reflector. For example, the network device may form the beam along the path ABC as shown in FIGS. 11-12.

In an embodiment, a second beam of the one or more beams may be transmitted to the terminal device along the LOS path. For example, the network device may form the beam along the path AC as shown in FIGS. 11-12.

In an embodiment, the terminal device may comprise a drone or a user equipment.

Figure 16:
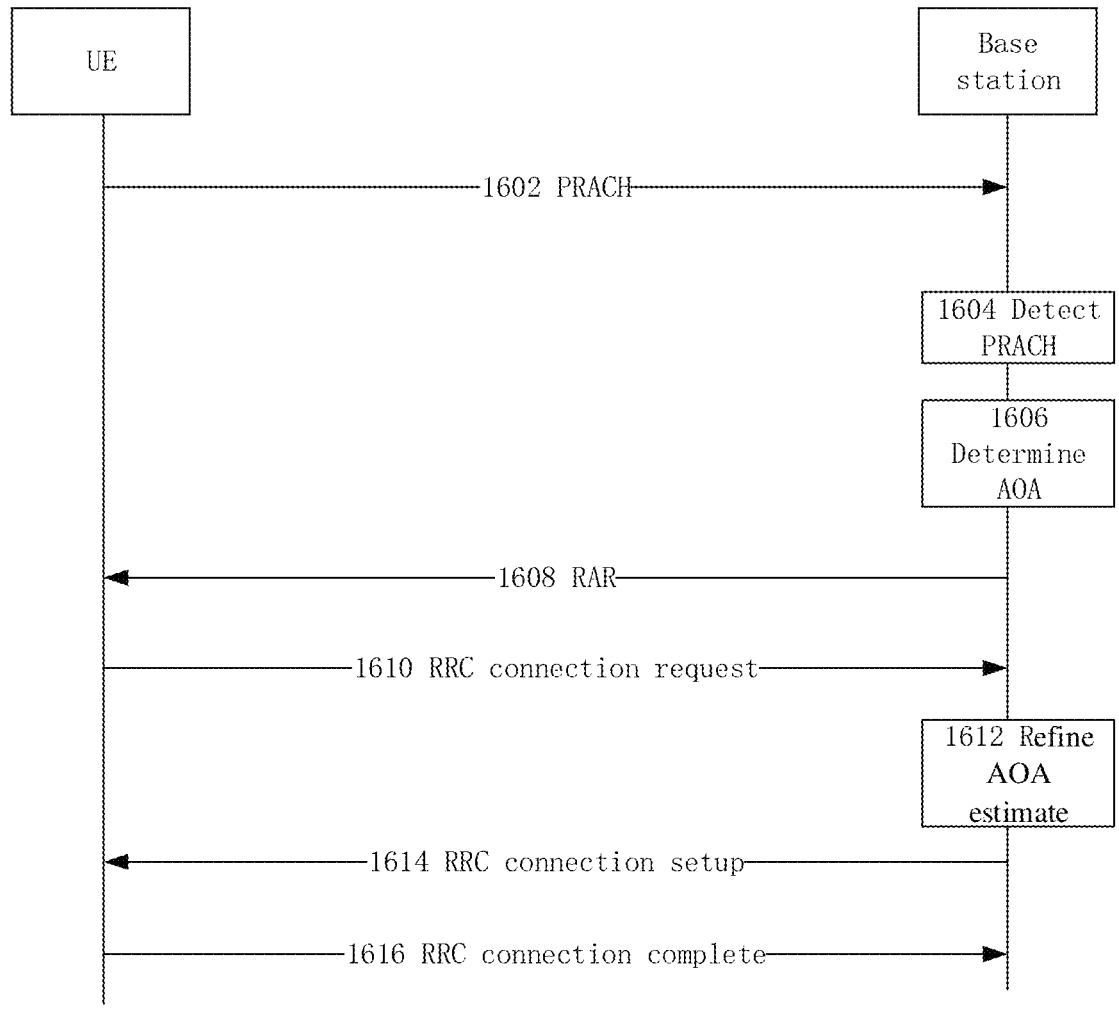
FIG. 16 shows a flowchart of a method according to an embodiment of the present disclosure.

FIG. 16 shows a flowchart of a method according to an embodiment of the present disclosure. As shown in FIG. 16, the base station comprises an antenna array with a radiation pattern including a main lobe, a back lobe and one or more side lobes and a reflector configured to reflect a part of energy of the back lobe to an area of at least one of the one or more side lobes. The UE is located in the area. The antenna array and the reflector may be similar to those as described with reference to FIGS. 2-8.

At step 1602, the UE sends PRACH preamble for example by using beam sweeping.

At step 1604, the base station detects the PRACH. For example, the base station may detect the PRACH from the LOS path between the antenna array and the UE and detect the PRACH from at least one path reflected by the reflector.

At step 1606, the base station determines respective AOAs of the LOS path and the at least one path reflected by the reflector.

At step 1608, the base station uses the AOA estimated from the PRACH transmission to form a beam to send a random access response (RAR). The width of this beam may be determined by the quality of the AOA estimation from the PRACH reception. The width of the beam can be controlled if necessary in the analog domain.

At step 1610, the UE sends a Radio Resource Control (RRC) connection request to the base station.

At step 1612, the base station receives the RRC connection request by using the information from the PRACH reception to improve reception and to refine the AOA estimate. Assuming that the AOA estimated from the PRACH is good enough, the reception of RRC connection request works for both digital and analog/hybrid beamforming.

At step 1614, the base station transmits RRC Connection Setup to UE. It is assumed that with the refined AOA estimate, RRC Connection Setup can be transmitted in a quite narrow beam.

At step 1616, UE sends RRC Connection Complete to the base station.

After UE is in connected mode, UE can send a positioning request via an application to core network. Core network may obtain the position of the UE from the bases station and send the position to UE via the application.

Figure 17:
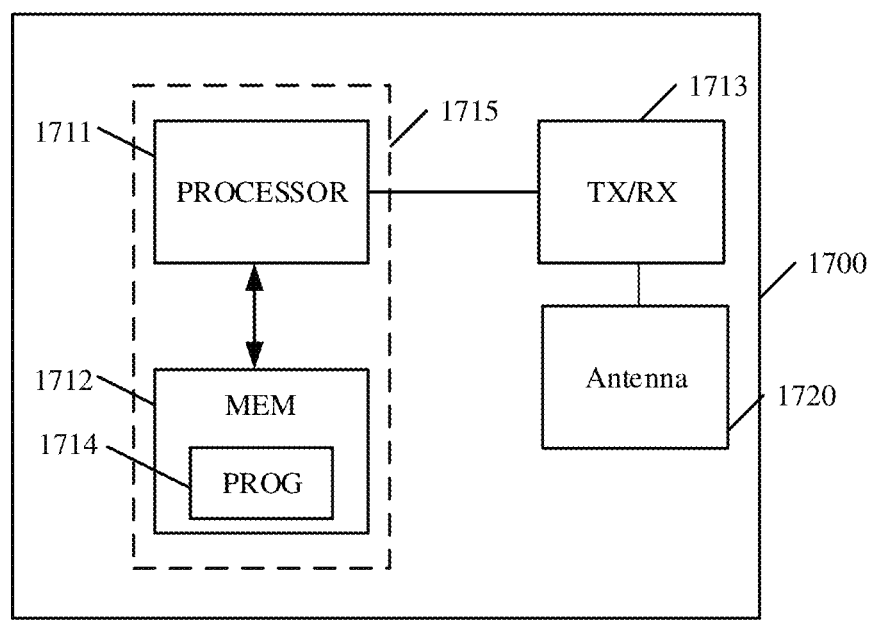
FIG. 17 is a block diagram showing a network device according to an embodiment of the disclosure.

FIG. 17 is a block diagram showing a network device according to an embodiment of the disclosure. The network device 1700 may comprise at least one processor 1711, such as a data processor (DP) and at least one memory (MEM) 1712 coupled to the processor 1711. The network device 1700 may further comprise a transmitter TX and receiver RX 1713 coupled to the processor 1711. The network device 1700 may further comprise an antenna device 1720 coupled to the transmitter TX and receiver RX 1713. The MEM 1712 stores a program (PROG) 1714. The PROG 1714 may include instructions that, when executed on the associated processor 1711, enable the network device 1700 to implement the method related to the network device as described above. A combination of the at least one processor 1711 and the at least one MEM 1712 may form processing means 1715 adapted to implement various embodiments of the present disclosure.

Various embodiments of the present disclosure may be implemented by computer program executable by one or more of the processor 1711, software, firmware, hardware or in a combination thereof.

The MEM 1712 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 1711 may be of any type suitable to the local technical environment, and may include one or more of general purpose computers, special purpose computers, microprocessors, digital signal processors (DSPs) and processors based on multicore processor architecture, as non-limiting examples.

Figure 18:
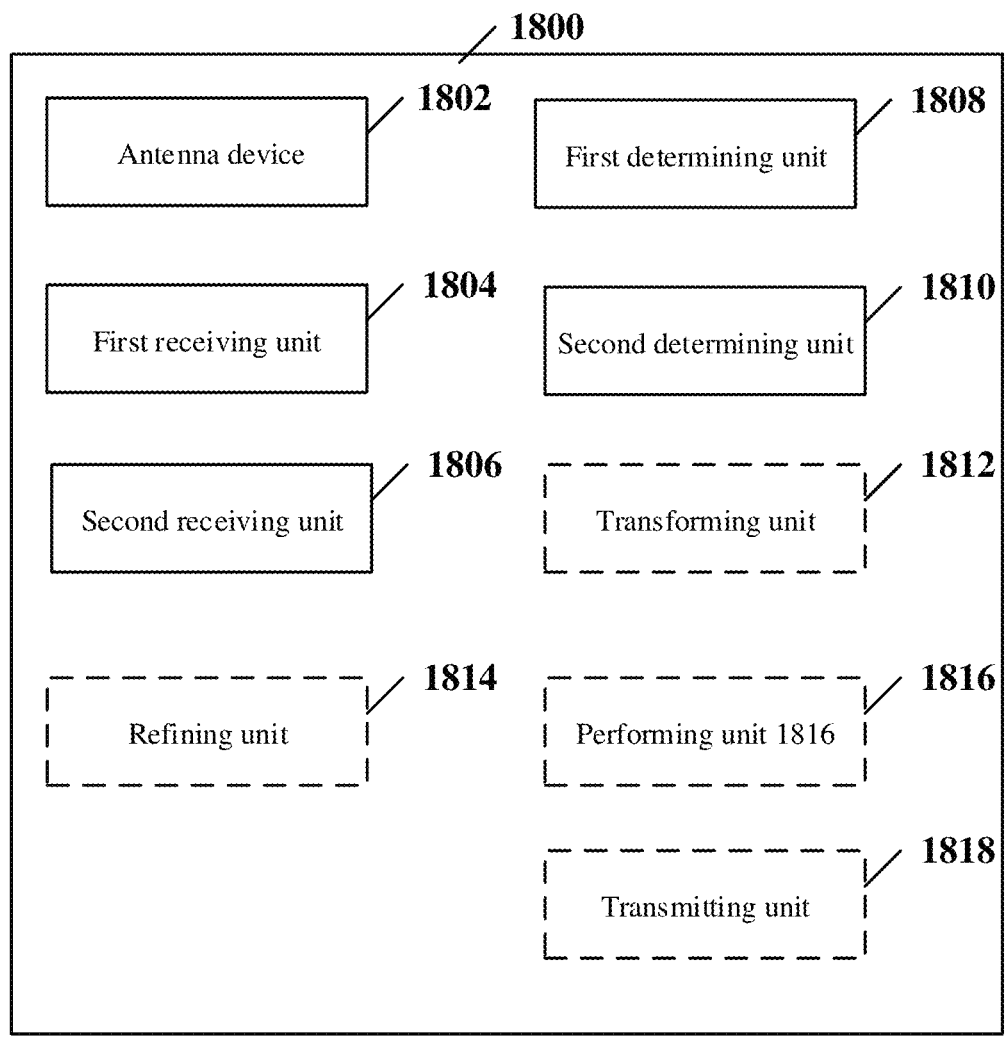
FIG. 18 is a block diagram showing a network device according to another embodiment of the disclosure.

FIG. 18 is a block diagram showing a network device according to another embodiment of the disclosure. The network device 1800 may comprise an antenna device 1802 including an antenna array with a radiation pattern including a main lobe, a back lobe and one or more side lobes and a reflector configured to reflect a part of energy of the back lobe to an area of at least one of the one or more side lobes. The network device 1800 may further comprise a first receiving unit 1804 configured to receive a first radio signal of a terminal device located in the area from a line of sight (LOS) path between the antenna array and the terminal device; a second receiving unit 1806 configured to receive a second radio signal of the terminal device located in the area from at least one path reflected by the reflector; a first determining unit 1808 configured to determine respective angles of arrival of the LOS path and the at least one path reflected by the reflector; and a second determining unit 1810 configured to determine a location of the terminal device by using triangulation based on the respective angles of arrival.

In an embodiment, the network device 1800 may further comprise a transforming unit 1812 (optional) configured to transform the location of the terminal device to coordinate information of World Geodetic System (WGS).

In an embodiment, the network device 1800 may further comprise a refining unit 1814 (optional) configured to refine the respective angles of arrival of the LOS path and the at least one path reflected by the reflector based on two or more received radio signals.

In an embodiment, the network device 1800 may further comprise a performing unit 1816 (optional) configured to perform beamforming based on the location of the terminal device; and a transmitting unit 1818 (optional) configured to transmit one or more beams to the terminal device based on the beamforming.

The proposed solution may have some advantages as following. The proposed solution can perform positioning of a UE within one base station, for example the base station can perform the positioning of the UE independently. The proposed solution does not require UE feedback. The proposed solution can provide a high accuracy. As shown in FIGS. 11-12, UE positioning accuracy may depend on accuracy of the distance AB and AOAs. Actually optical instrument has very high accuracy. For example, a typical total station can measure distances with an accuracy of about 1.5 millimeters (0.0049 ft (foot))+2 parts per million over a distance of up to 1,500 meters (4,900 ft), microwave antenna emits waves in narrow beams and hits other antenna across long distance (more than 50 km), so the distance between the antenna array and the reflector is not a major problem for accuracy. AOA determines accuracy of this proposed solution, which is similar as TOA/TDOA/AOA, but TOA/TDOA/AOA can't be easily implemented for in-door LOS scenario as TOA/TDOA need at least 3 base stations for measurement and AOA needs at least 2 base stations for measurement. The proposed solution can get a tighter accuracy with the antenna array including more antenna elements. The proposed solution is synchronization free. The proposed solution can get better performance for high frequency than traditional methods.

According to an aspect of the disclosure it is provided a computer program product being tangibly stored on a computer readable storage medium and including instructions which, when executed on at least one processor, cause the at least one processor to carry out any of the methods related to the network device as described above.

According to an aspect of the disclosure it is provided a computer-readable storage medium storing instructions which when executed by at least one processor, cause the at least one processor to carry out carry out any of the methods related to the network device as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 19:
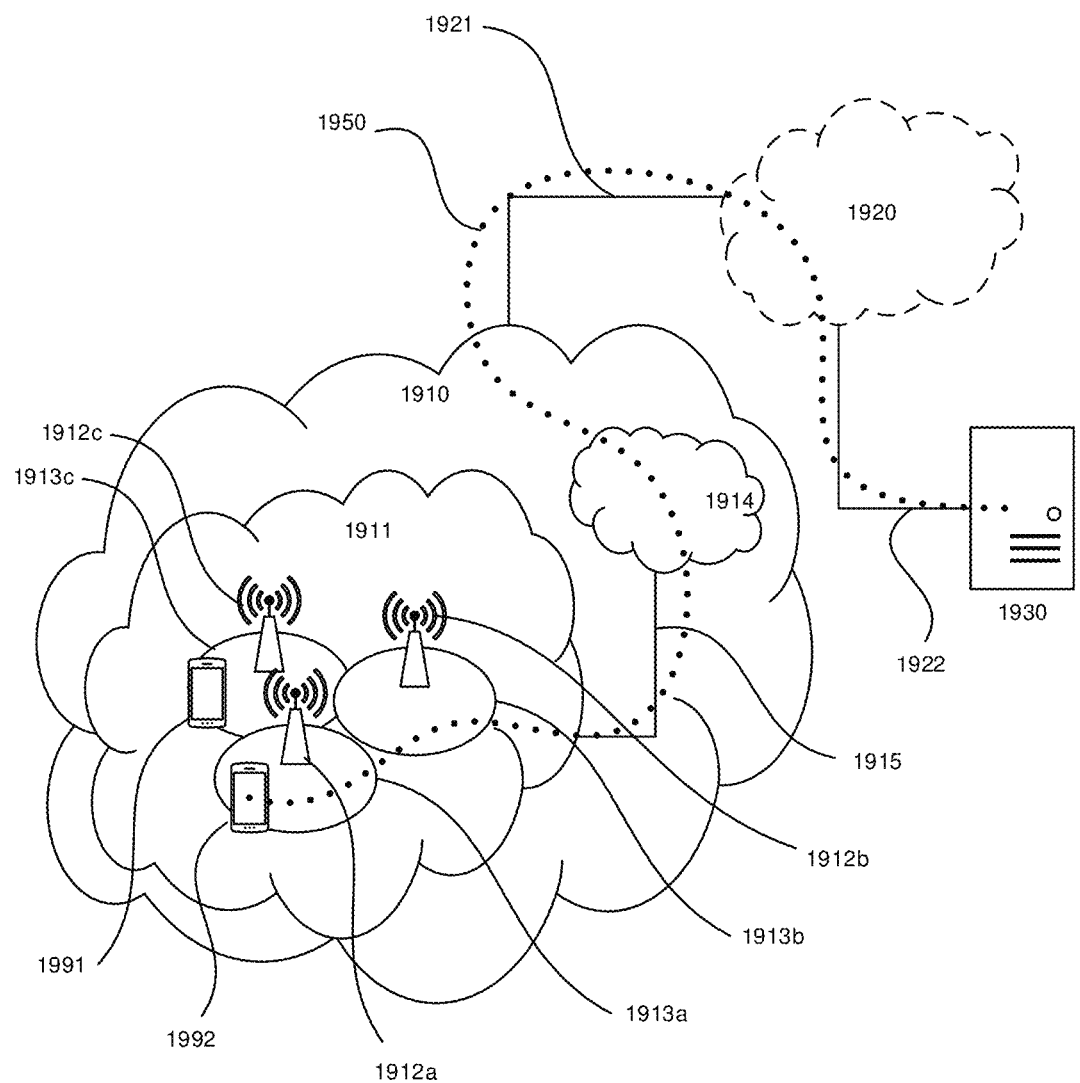
FIG. 19 is a block diagram illustrating a telecommunication network connected via an intermediate network to a host computer in accordance with some embodiments of the present disclosure.

FIG. 19 is a block diagram illustrating a telecommunication network connected via an intermediate network to a host computer in accordance with some embodiments of the present disclosure.

With reference to FIG. 19, in accordance with an embodiment, a communication system includes a telecommunication network 1910, such as a 3GPP-type cellular network, which comprises an access network 1911, such as a radio access network, and a core network 1914. The access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to the core network 1914 over a wired or wireless connection 1915. A first UE 1991 located in a coverage area 1913c is configured to wirelessly connect to, or be paged by, the corresponding base station 1912c. A second UE 1992 in a coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

The telecommunication network 1910 is itself connected to a host computer 1930, which may be embodied in the hardware and/or software of a standalone server, a cloud-implemented server, a distributed server or as processing resources in a server farm. The host computer 1930 may be under the ownership or control of a service provider, or may be operated by the service provider or on behalf of the service provider. Connections 1921 and 1922 between the telecommunication network 1910 and the host computer 1930 may extend directly from the core network 1914 to the host computer 1930 or may go via an optional intermediate network 1920. An intermediate network 1920 may be one of, or a combination of more than one of, a public, private or hosted network; the intermediate network 1920, if any, may be a backbone network or the Internet; in particular, the intermediate network 1920 may comprise two or more sub-networks (not shown).

The communication system of FIG. 19 as a whole enables connectivity between the connected UEs 1991, 1992 and the host computer 1930. The connectivity may be described as an over-the-top (OTT) connection 1950. The host computer 1930 and the connected UEs 1991, 1992 are configured to communicate data and/or signaling via the OTT connection 1950, using the access network 1911, the core network 1914, any intermediate network 1920 and possible further infrastructure (not shown) as intermediaries. The OTT connection 1950 may be transparent in the sense that the participating communication devices through which the OTT connection 1950 passes are unaware of routing of uplink and downlink communications. For example, the base station 1912 may not or need not be informed about the past routing of an incoming downlink communication with data originating from the host computer 1930 to be forwarded (e.g., handed over) to a connected UE 1991. Similarly, the base station 1912 need not be aware of the future routing of an outgoing uplink communication originating from the UE 1991 towards the host computer 1930.

Figure 20:
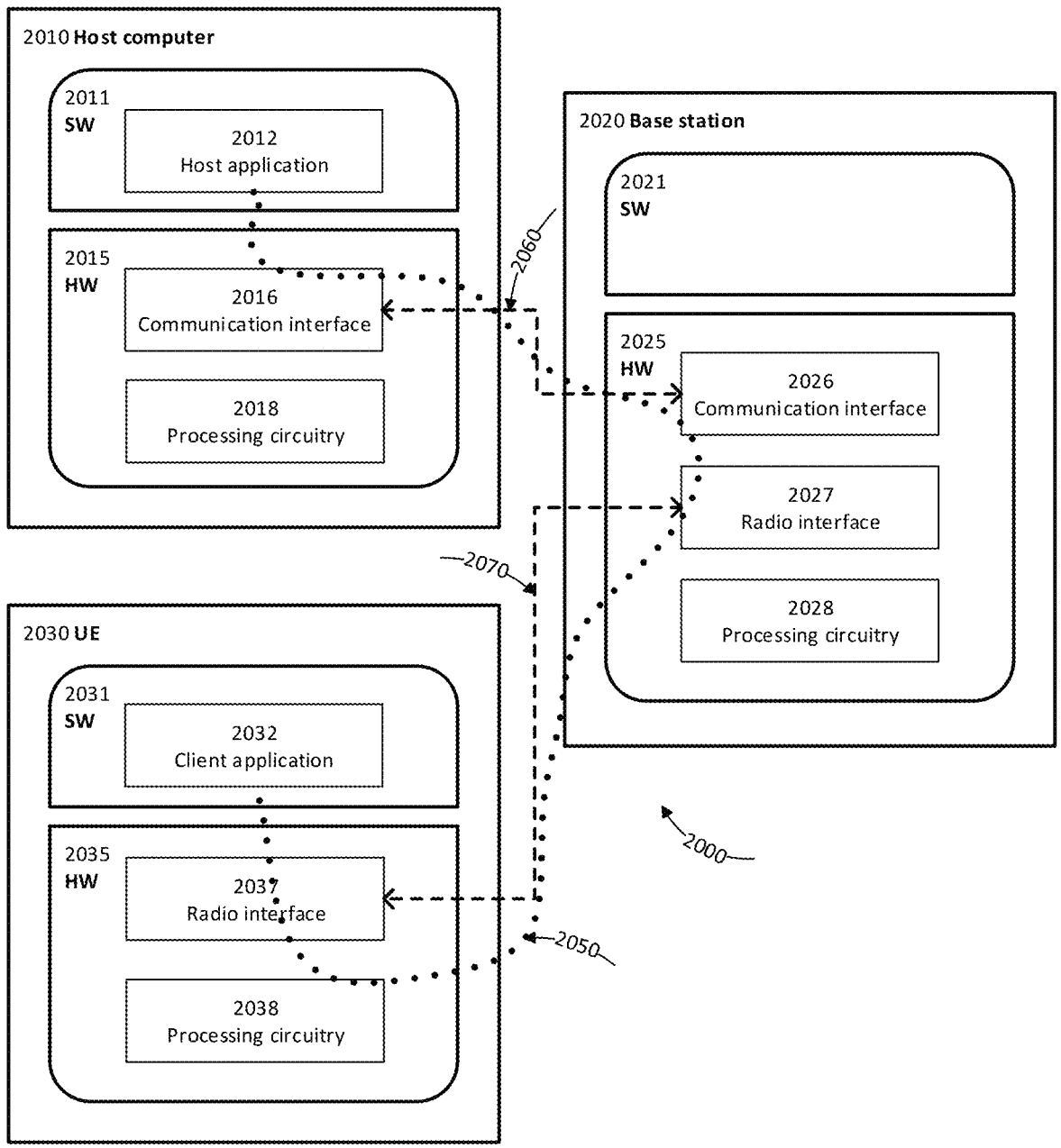
FIG. 20 is a block diagram illustrating a host computer communicating via a base station with a UE over a partially wireless connection in accordance with some embodiments of the present disclosure.

FIG. 20 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 20. In a communication system 2000, a host computer 2010 comprises hardware 2015 including a communication interface 2016 configured to set up and maintain a wired or wireless connection with an interface of a different communication device of the communication system 2000. The host computer 2010 further comprises a processing circuitry 2018, which may have storage and/or processing capabilities. In particular, the processing circuitry 2018 may comprise one or more programmable processors, application-specific integrated circuits, field programmable gate arrays or combinations of these (not shown) adapted to execute instructions. The host computer 2010 further comprises software 2011, which is stored in or accessible by the host computer 2010 and executable by the processing circuitry 2018. The software 2011 includes a host application 2012. The host application 2012 may be operable to provide a service to a remote user, such as UE 2030 connecting via an OTT connection 2050 terminating at the UE 2030 and the host computer 2010. In providing the service to the remote user, the host application 2012 may provide user data which is transmitted using the OTT connection 2050.

The communication system 2000 further includes a base station 2020 provided in a telecommunication system and comprising hardware 2025 enabling it to communicate with the host computer 2010 and with the UE 2030. The hardware 2025 may include a communication interface 2026 for setting up and maintaining a wired or wireless connection with an interface of a different communication device of the communication system 2000, as well as a radio interface 2027 for setting up and maintaining at least a wireless connection 2070 with the UE 2030 located in a coverage area (not shown in FIG. 20) served by the base station 2020. The communication interface 2026 may be configured to facilitate a connection 2060 to the host computer 2010. The connection 2060 may be direct or it may pass through a core network (not shown in FIG. 20) of the telecommunication system and/or through one or more intermediate networks outside the telecommunication system. In the embodiment shown, the hardware 2025 of the base station 2020 further includes a processing circuitry 2028, which may comprise one or more programmable processors, application-specific integrated circuits, field programmable gate arrays or combinations of these (not shown) adapted to execute instructions. The base station 2020 further has software 2021 stored internally or accessible via an external connection.

The communication system 2000 further includes the UE 2030 already referred to. Its hardware 2035 may include a radio interface 2037 configured to set up and maintain a wireless connection 2070 with a base station serving a coverage area in which the UE 2030 is currently located. The hardware 2035 of the UE 2030 further includes a processing circuitry 2038, which may comprise one or more programmable processors, application-specific integrated circuits, field programmable gate arrays or combinations of these (not shown) adapted to execute instructions. The UE 2030 further comprises software 2031, which is stored in or accessible by the UE 2030 and executable by the processing circuitry 2038. The software 2031 includes a client application 2032. The client application 2032 may be operable to provide a service to a human or non-human user via the UE 2030, with the support of the host computer 2010. In the host computer 2010, an executing host application 2012 may communicate with the executing client application 2032 via the OTT connection 2050 terminating at the UE 2030 and the host computer 2010. In providing the service to the user, the client application 2032 may receive request data from the host application 2012 and provide user data in response to the request data. The OTT connection 2050 may transfer both the request data and the user data. The client application 2032 may interact with the user to generate the user data that it provides.

It is noted that the host computer 2010, the base station 2020 and the UE 2030 illustrated in FIG. 20 may be similar or identical to the host computer 1930, one of base stations 1912a, 1912b, 1912c and one of UEs 1991, 1992 of FIG. 19, respectively. This is to say, the inner workings of these entities may be as shown in FIG. 20 and independently, the surrounding network topology may be that of FIG. 19.

In FIG. 20, the OTT connection 2050 has been drawn abstractly to illustrate the communication between the host computer 2010 and the UE 2030 via the base station 2020, without explicit reference to any intermediary devices and the precise routing of messages via these devices. Network infrastructure may determine the routing, which it may be configured to hide from the UE 2030 or from the service provider operating the host computer 2010, or both. While the OTT connection 2050 is active, the network infrastructure may further take decisions by which it dynamically changes the routing (e.g., on the basis of load balancing consideration or reconfiguration of the network).

Wireless connection 2070 between the UE 2030 and the base station 2020 is in accordance with the teachings of the embodiments described throughout this disclosure. One or more of the various embodiments improve the performance of OTT services provided to the UE 2030 using the OTT connection 2050, in which the wireless connection 2070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 2050 between the host computer 2010 and the UE 2030, in response to variations in the measurement results. The measurement procedure and/or the network functionality for reconfiguring the OTT connection 2050 may be implemented in software 2011 and hardware 2015 of the host computer 2010 or in software 2031 and hardware 2035 of the UE 2030, or both. In embodiments, sensors (not shown) may be deployed in or in association with communication devices through which the OTT connection 2050 passes; the sensors may participate in the measurement procedure by supplying values of the monitored quantities exemplified above, or supplying values of other physical quantities from which the software 2011, 2031 may compute or estimate the monitored quantities. The reconfiguring of the OTT connection 2050 may include message format, retransmission settings, preferred routing etc.; the reconfiguring need not affect the base station 2020, and it may be unknown or imperceptible to the base station 2020. Such procedures and functionalities may be known and practiced in the art. In certain embodiments, measurements may involve proprietary UE signaling facilitating the host computer 2010's measurements of throughput, propagation times, latency and the like. The measurements may be implemented in that the software 2011 and 2031 causes messages to be transmitted, in particular empty or 'dummy' messages, using the OTT connection 2050 while it monitors propagation times, errors etc.

Figure 21:
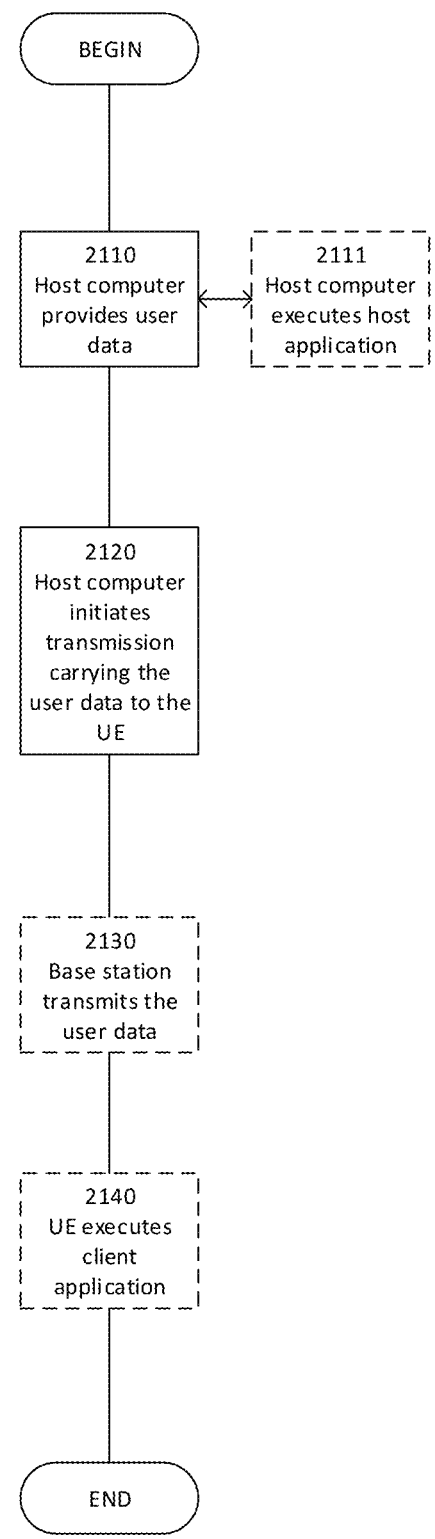
FIG. 21 is a flowchart illustrating a method implemented in a communication system, in accordance with an embodiment of the present disclosure.

FIG. 21 is a flowchart illustrating a method implemented in a communication system, in accordance with an embodiment. The communication system includes a host computer, a base station and a UE which may be those described with reference to FIG. 19 and FIG. 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
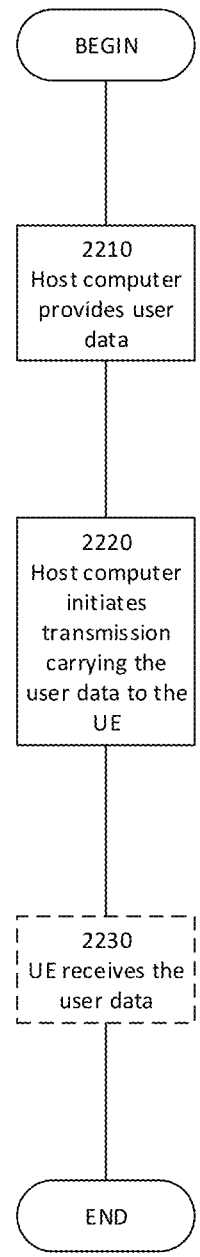
FIG. 22 is a flowchart illustrating a method implemented in a communication system, in accordance with an embodiment of the present disclosure.

FIG. 22 is a flowchart illustrating a method implemented in a communication system, in accordance with an embodiment. The communication system includes a host computer, a base station and a UE which may be those described with reference to FIG. 19 and FIG. 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
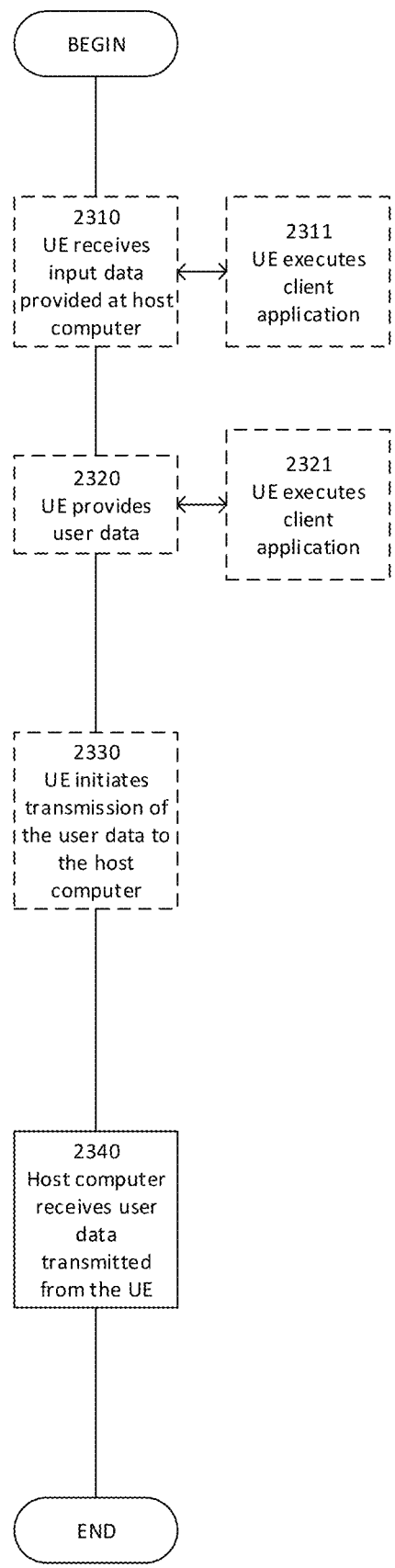
FIG. 23 is a flowchart illustrating a method implemented in a communication system, in accordance with an embodiment of the present disclosure.

FIG. 23 is a flowchart illustrating a method implemented in a communication system, in accordance with an embodiment. The communication system includes a host computer, a base station and a UE which may be those described with reference to FIG. 8 and FIG. 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
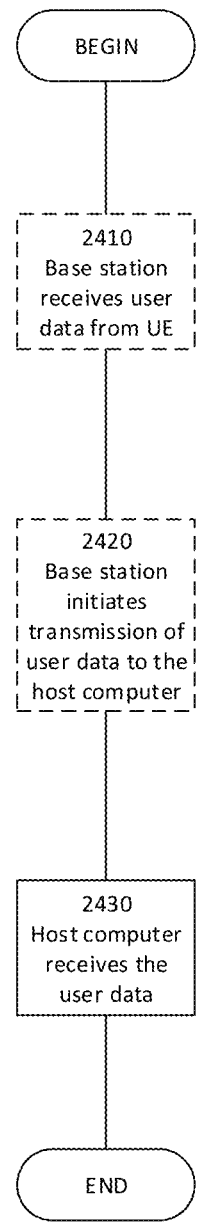
FIG. 24 is a flowchart illustrating a method implemented in a communication system, in accordance with an embodiment of the present disclosure.

FIG. 24 is a flowchart illustrating a method implemented in a communication system, in accordance with an embodiment. The communication system includes a host computer, a base station and a UE which may be those described with reference to FIG. 19 and FIG. 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a network device, the network device comprising an antenna device including an antenna array positioned to receive communications from a reflector configured to reflect a part of energy transmitted by a terminal device to the antenna array, the method comprising:
   receiving a first radio signal from the terminal device in a line-of-sight (LOS) path from the terminal device to the antenna array;
   receiving a second radio signal from the terminal device in a reflected path from the terminal device reflected by the reflector to the antenna array;
   determining a first angle of arrival of the LOS path at the antenna array;
   determining a second angle of arrival of the reflected path at the reflector;
   determining the LOS path and the reflected path are first and second skew lines that are not parallel and not intersecting;
   determining nearest points on the first and second skew lines; and
   determining a location of the terminal device based on the nearest points.

2. The method according to claim 1, further comprising:
   transforming the location of the terminal device to coordinate information of World Geodetic System (WGS).

3. The method according to claim 1, wherein the first and second radio signal comprises one or both of a random access radio signal and a radio resource control connection request radio signal.

4. The method according to claim 1, further comprising:
   refining the respective angles of arrival of the LOS path and the reflected path based on two or more received radio signals.

5. The method according to claim 1, further comprising:
performing beamforming based on the location of the terminal device; and
transmitting one or more beams to the terminal device based on the beamforming.

6. The method according to claim 5, wherein a first beam of the one or more beams is transmitted to the terminal device through the reflection of the reflector.

7. The method according to claim 5, wherein a second beam of the one or more beams is transmitted to the terminal device along the LOS path.

8. The method according to claim 1, wherein the terminal device comprises a drone or a user equipment.

9. An apparatus at a network device, the network device comprising antenna device including an antenna array positioned to receive communications from a reflector configured to reflect a part of energy of transmitted by a terminal device to the antenna array, the apparatus comprising:
a processor;
a memory coupled to the processor, said memory containing instructions executable by said processor, whereby the apparatus is operative to:
receive a first radio signal from the terminal device in a line-of-sight (LOS) path from the terminal device to the antenna array;
receive a second radio signal from the terminal device in a reflected path from the terminal device reflected by the reflector to the antenna array;
determine a first angle of arrival of the LOS path at the antenna array;
determine a second angle of arrival of the reflected path at the reflector;
determine the LOS path and the reflected path are first and second skew lines that are not parallel and not intersecting;
determine nearest points on the first and second skew lines; and
determine a location of the terminal device based on the nearest points.

10. The apparatus according to claim 9, the memory containing instructions executable by the processor, whereby the apparatus is further operative to:
transform the location of the terminal device to coordinate information of World Geodetic System (WGS).

11. The apparatus according to claim 9, wherein the first and second radio signal comprises one or both of a random access radio signal and a radio resource control connection request radio signal.

12. The apparatus according to claim 9, the memory containing instructions executable by the processor, whereby the apparatus is further operative to:
refine the respective angles of arrival of the LOS path and the reflected path based on two or more received radio signals.

13. The method according to claim 1, further comprising determining the location of the terminal device to be at the center of a line segment between the nearest points.

14. The apparatus according to claim 9, the memory containing instructions executable by the processor, whereby the apparatus is further operative to:
determine the location of the terminal device to be at the center of a line segment between the nearest points.

* * * * *